US008140639B2

(12) United States Patent
Fukui et al.

(10) Patent No.: US 8,140,639 B2
(45) Date of Patent: Mar. 20, 2012

(54) INFORMATION-PROCESSING SYSTEM, METHOD FOR TRANSMITTING AND RECEIVING DATA, IMAGE-PROCESSING APPARATUS SUITED ESPECIALLY FOR TRANSMITTING AND RECEIVING DATA AMONG A PLURALITY OF IMAGE-PROCESSING APPARATUSES CONNECTED TO NETWORK

(75) Inventors: Kazuyuki Fukui, Toyohashi (JP); Mikio Masui, Kobe (JP); Hiroyuki Ozawa, Kawasaki (JP); Shuichiro Kaneko, Yokohama (JP); Norihisa Takayama, Kobe (JP); Yoshikazu Ikenoue, Itami (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 952 days.

(21) Appl. No.: 11/677,454

(22) Filed: Feb. 21, 2007

(65) Prior Publication Data
US 2007/0201083 A1 Aug. 30, 2007

(30) Foreign Application Priority Data

Feb. 24, 2006 (JP) .................................. 2006-49408

(51) Int. Cl.
*G06F 15/16* (2006.01)
*G06F 3/12* (2006.01)
*G06K 15/00* (2006.01)
(52) U.S. Cl. ....... 709/217; 709/218; 709/219; 358/1.14; 358/1.15
(58) Field of Classification Search .......... 709/217–219; 358/1.14, 1.15
See application file for complete search history.

(56) References Cited

U.S. PATENT DOCUMENTS

| 5,784,664 | A | * | 7/1998 | Nakamura et al. ................. 399/8 |
| 7,606,880 | B2 | * | 10/2009 | Shima ........................... 709/220 |
| 2001/0033642 | A1 | * | 10/2001 | Abrishami et al. ...... 379/100.01 |

(Continued)

FOREIGN PATENT DOCUMENTS

JP 10-257225 9/1998

(Continued)

OTHER PUBLICATIONS

Notice of Ground of Rejection in JP 2006-049408 dated Apr. 15, 2008, and Translations thereof.

*Primary Examiner* — Joe Cheng
*Assistant Examiner* — Kai Chang
(74) *Attorney, Agent, or Firm* — Buchanan Ingersoll & Rooney PC

(57) ABSTRACT

In order to efficiently store data that is to be transmitted or received, an image-processing system is provided with a plurality of MFPs and has: a designation unit to designate an arbitrary destination user as a receiver of data; a specifying unit to specify an MFP among the plurality of MFPs, the destination user designated by the designation unit belonging to the specified MFP; and a control unit to control switching between a first mode and a second mode in accordance with a predetermined condition, the first mode being for storing the data in a predetermined storing device on the network so as to enable reading of the data by an operation by the destination user designated by the designation unit, the second mode being for, instead of storing the data in the predetermined storing device, transmitting the data to the MFP specified by the specifying unit, the destination user belonging to the specified image-processing apparatus.

15 Claims, 23 Drawing Sheets

U.S. PATENT DOCUMENTS

| | | | |
|---|---|---|---|
| 2001/0040692 A1* | 11/2001 | Matsueda et al. | 358/1.14 |
| 2002/0027673 A1* | 3/2002 | Roosen et al. | 358/1.13 |
| 2003/0107762 A1* | 6/2003 | Kinoshita et al. | 358/1.15 |
| 2003/0233467 A1* | 12/2003 | Ogasawara | 709/232 |
| 2004/0036908 A1* | 2/2004 | Yagita et al. | 358/1.15 |
| 2004/0080779 A1* | 4/2004 | Kawamoto | 358/1.14 |
| 2004/0263905 A1* | 12/2004 | Okuyama | 358/1.16 |
| 2005/0088680 A1* | 4/2005 | Ahn | 358/1.14 |
| 2006/0274358 A1 | 12/2006 | Fukui et al. | |
| 2006/0274359 A1 | 12/2006 | Fukui et al. | |
| 2006/0274360 A1 | 12/2006 | Fukui et al. | |
| 2007/0011198 A1 | 1/2007 | Fukui et al. | |
| 2007/0011410 A1 | 1/2007 | Fukui et al. | |

FOREIGN PATENT DOCUMENTS

| | | |
|---|---|---|
| JP | 2000-092294 | 3/2000 |
| JP | 2002-281219 | 9/2002 |
| JP | 2003-092657 | 3/2003 |
| JP | 2003-179713 A | 6/2003 |
| JP | 2003-283722 | 10/2003 |
| JP | 2006-041765 | 2/2006 |

* cited by examiner

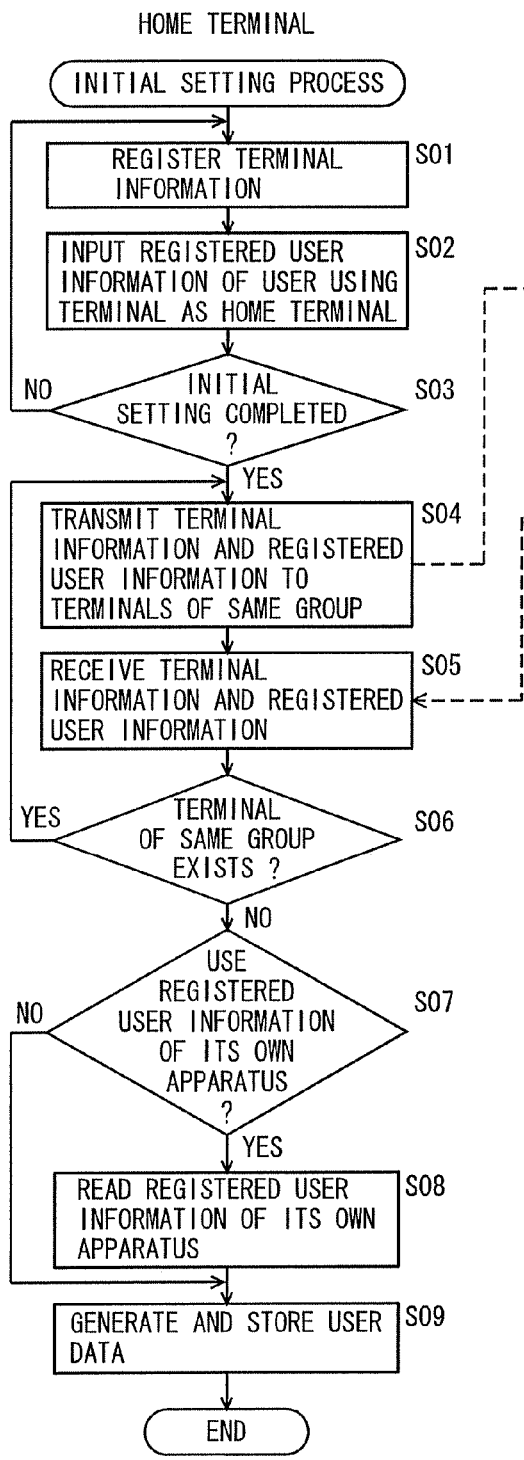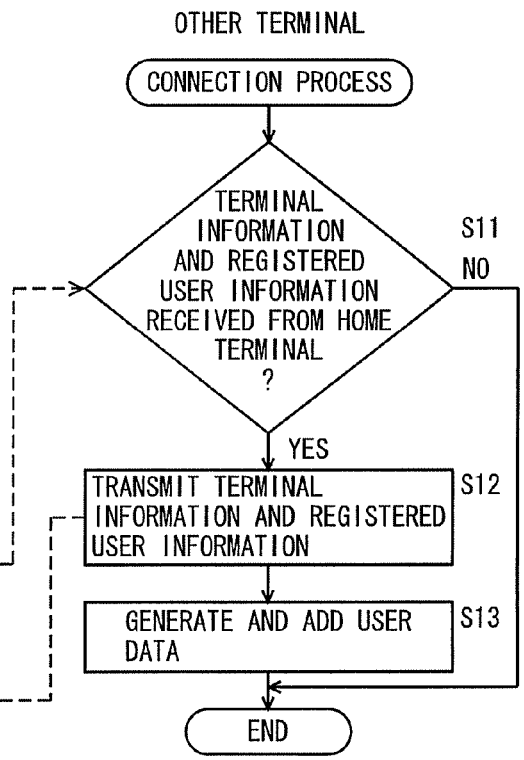
FIG. 3A / FIG. 3B

FIG. 4A

REGISTERED USER INFORMATION OF MFP 100

| NUMBER | USER IDENTIFICATION INFORMATION | DIVISION NAME | E-mail ADDRESS | FACE IMAGE | PASSWORD | FORCED RECEPTION FLAG |
|---|---|---|---|---|---|---|
| 1 | DAVID | SECRETARIAT | david@xxx.jp | david.jpg | xxx | OFF |

FIG. 4B

REGISTERED USER INFORMATION OF MFP 100A

| NUMBER | USER IDENTIFICATION INFORMATION | DIVISION NAME | E-mail ADDRESS | FACE IMAGE | PASSWORD | FORCED RECEPTION FLAG |
|---|---|---|---|---|---|---|
| 2 | JULIE | PLANNING DIVISION | julie@xxx.jp | julie.jpg | xxxx | OFF |

FIG. 4C

REGISTERED USER INFORMATION OF MFP 100B

| NUMBER | USER IDENTIFICATION INFORMATION | DIVISION NAME | E-mail ADDRESS | FACE IMAGE | PASSWORD | FORCED RECEPTION FLAG |
|---|---|---|---|---|---|---|
| 3 | TED | GENERAL AFFAIRS DIVISION | ted@xxx.jp | ted.jpg | xxxxx | ON |

FIG. 4D

REGISTERED USER INFORMATION OF MFP 100C

| NUMBER | USER IDENTIFICATION INFORMATION | DIVISION NAME | E-mail ADDRESS | FACE IMAGE | PASSWORD | FORCED RECEPTION FLAG |
|---|---|---|---|---|---|---|
| 4 | MICHAEL | DEVELOPMENT DIVISION | michael@xxx.jp | michael.jpg | xxxxx | ON |
| 5 | SUSAN | RESEARCH DIVISION | susan@xxx.jp | susan.jpg | xxxxxx | OFF |

F I G. 4 E

FIRST USER DATA OF MFP 100

| NUMBER | USER IDENTIFICATION INFORMATION | DIVISION NAME | E-mail ADDRESS | FACE IMAGE | PASSWORD | HOME TERMINAL | LOCATION WHERE HOME TERMINAL IS DISPOSED | FORCED RECEPTION FLAG |
|---|---|---|---|---|---|---|---|---|
| 1 | DAVID | SECRETARIAT | david@xxx.jp | david.jpg | xxx | IP ADDRESS OF MFP 100 | 19th FLOOR COPIER ROOM | OFF |
| 2 | JULIE | PLANNING DIVISION | julie@xxx.jp | julie.jpg | xxxx | IP ADDRESS OF MFP 100A | 5th FLOOR PLANNING DIVISION | OFF |
| 3 | TED | GENERAL AFFAIRS DIVISION | ted@xxx.jp | ted.jpg | xxxxx | IP ADDRESS OF MFP 100B | 4th FLOOR CONFERENCE ROOM | ON |
| 4 | MICHAEL | DEVELOPMENT DIVISION | michael@xxx.jp | michael.jpg | xxxxx | IP ADDRESS OF MFP 100C | 14th FLOOR CONFERENCE ROOM | ON |
| 5 | SUSAN | RESEARCH DIVISION | susan@xxx.jp | susan.jpg | xxxxxx | IP ADDRESS OF MFP 100C | 7th FLOOR LABORATORY | OFF |

F I G. 4 F

SECOND USER DATA OF MFP 100

| NUMBER | USER IDENTIFICATION INFORMATION | DIVISION NAME | E-mail ADDRESS | FACE IMAGE | PASSWORD | HOME TERMINAL | LOCATION WHERE HOME TERMINAL IS DISPOSED | FORCED RECEPTION FLAG |
|---|---|---|---|---|---|---|---|---|
| 2 | JULIE | PLANNING DIVISION | julie@xxx.jp | julie.jpg | xxxx | IP ADDRESS OF MFP 100A | 5th FLOOR PLANNING DIVISION | OFF |
| 3 | TED | GENERAL AFFAIRS DIVISION | ted@xxx.jp | ted.jpg | xxxxx | IP ADDRESS OF MFP 100B | 4th FLOOR CONFERENCE ROOM | ON |
| 4 | MICHAEL | DEVELOPMENT DIVISION | michael@xxx.jp | michael.jpg | xxxxx | IP ADDRESS OF MFP 100C | 14th FLOOR CONFERENCE ROOM | ON |
| 5 | SUSAN | RESEARCH DIVISION | susan@xxx.jp | susan.jpg | xxxxxx | IP ADDRESS OF MFP 100C | 7th FLOOR LABORATORY | OFF |

F I G. 8

JOB ATTRIBUTE INFORMATION

| TRANSMISSION ORIGIN INFORMATION | DESTINATION INFORMATION | | IMAGE DATA INFORMATION | |
|---|---|---|---|---|
| USER IDENTIFICATION INFORMATION | USER IDENTIFICATION INFORMATION | APPARATUS IDENTIFICATION INFORMATION OF HOME TERMINAL | APPARATUS IDENTIFICATION INFORMATION | FILE NAME |

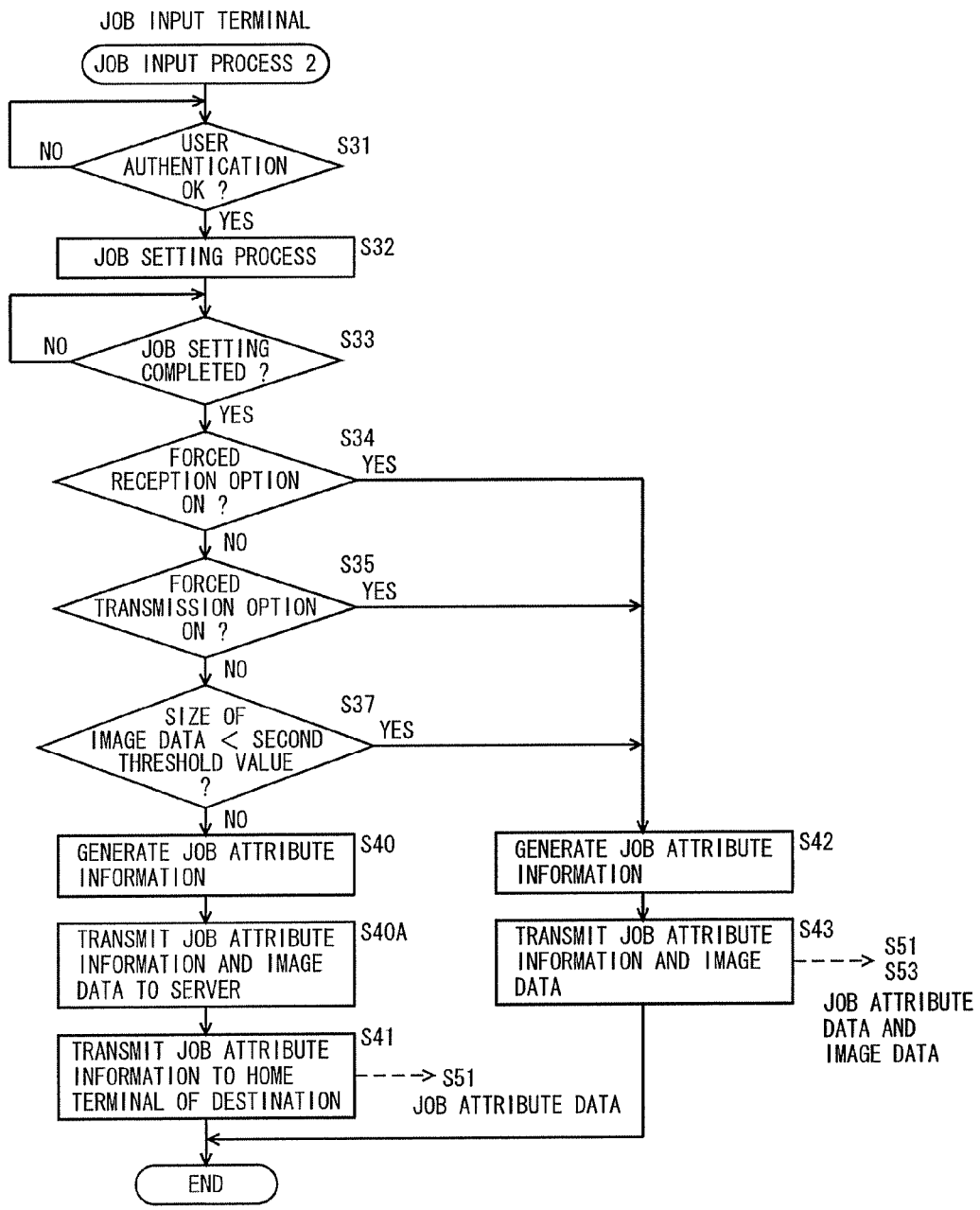

FIG. 17A

FIRST USER DATA OF MFP 100

| NUMBER | USER IDENTIFICATION INFORMATION | DIVISION NAME | E-mail ADDRESS | FACE IMAGE | PASSWORD | FORCED RECEPTION FLAG |
|---|---|---|---|---|---|---|
| 1 | DAVID | SECRETARIAT | david@xxx.jp | david.jpg | xxx | OFF |
| 2 | JULIE | PLANNING DIVISION | julie@xxx.jp | julie.jpg | xxxx | OFF |
| 3 | TED | GENERAL AFFAIRS DIVISION | ted@xxx.jp | ted.jpg | xxxxx | ON |
| 4 | MICHAEL | DEVELOPMENT DIVISION | michael@xxx.jp | michael.jpg | xxxxx | ON |
| 5 | SUSAN | RESEARCH DIVISION | susan@xxx.jp | susan.jpg | xxxxxx | OFF |

FIG. 17B

SECOND USER DATA OF MFP 100

| NUMBER | USER IDENTIFICATION INFORMATION | DIVISION NAME | E-mail ADDRESS | FACE IMAGE | PASSWORD | FORCED RECEPTION FLAG |
|---|---|---|---|---|---|---|
| 2 | JULIE | PLANNING DIVISION | julie@xxx.jp | julie.jpg | xxxx | OFF |
| 3 | TED | GENERAL AFFAIRS DIVISION | ted@xxx.jp | ted.jpg | xxxxx | ON |
| 4 | MICHAEL | DEVELOPMENT DIVISION | michael@xxx.jp | michael.jpg | xxxxx | ON |
| 5 | SUSAN | RESEARCH DIVISION | susan@xxx.jp | susan.jpg | xxxxxx | OFF |

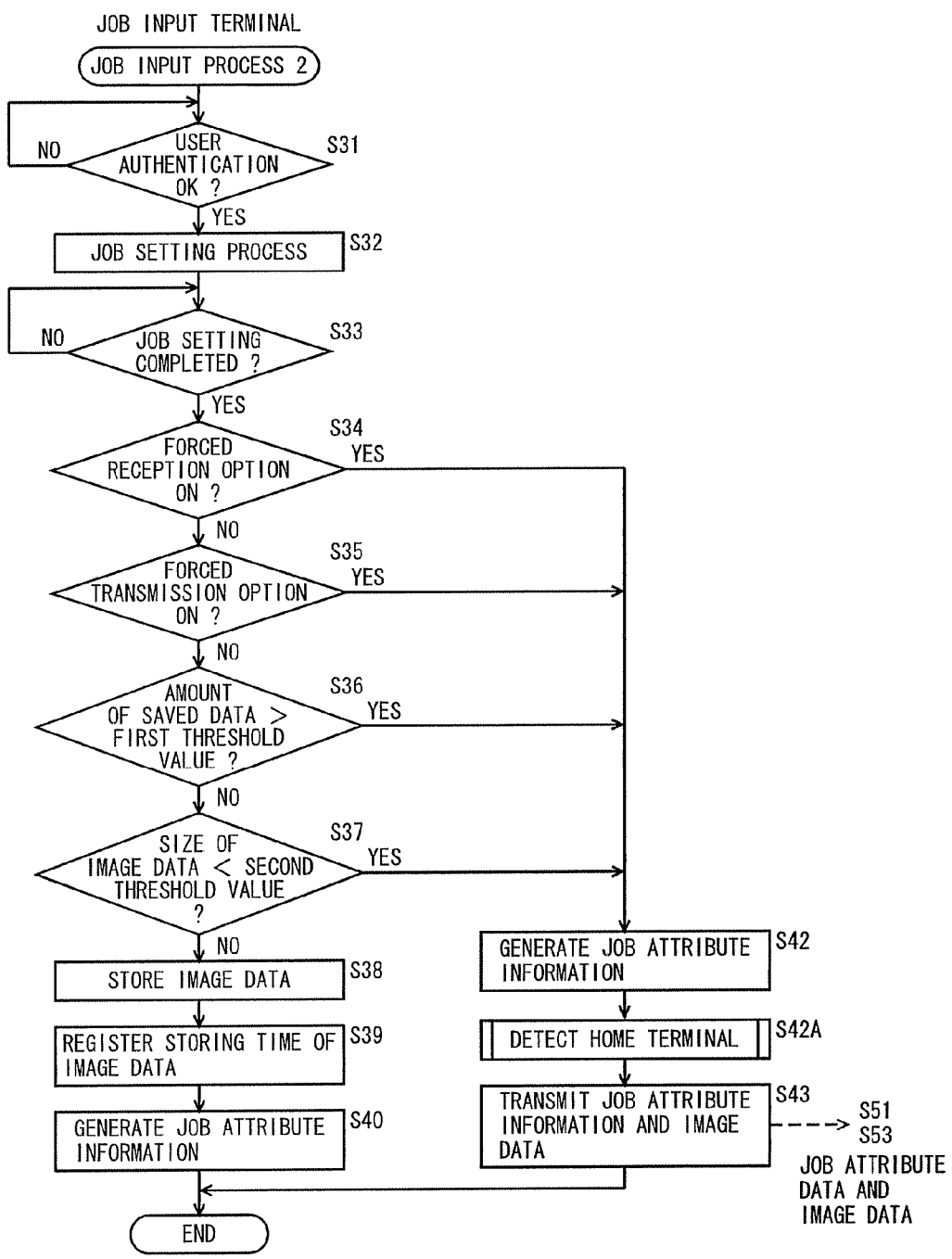

F I G. 1 9

JOB ATTRIBUTE INFORMATION

| TRANSMISSION ORIGIN INFORMATION | DESTINATION INFORMATION | IMAGE DATA INFORMATION | |
|---|---|---|---|
| USER IDENTIFICATION INFORMATION | USER IDENTIFICATION INFORMATION | APPARATUS IDENTIFICATION INFORMATION | FILE NAME |

FIG. 20A

JOB INPUT TERMINAL ( HOME TERMINAL DETECTION PROCESS )
↓
TRANSMIT REQUEST FOR DETECTION OF HOME TERMINAL BY BROADCAST
↓
◇ APPARATUS IDENTIFICATION INFORMATION RECEIVED ? — YES → SET AS HOME TERMINAL → ( RETURN )
↓ NO
S94 SET AS HOME TERMINAL BEING NONEXISTENT →

S91 USER IDENTIFICATION INFORMATION
S92 APPARATUS IDENTIFICATION INFORMATION
S93 SET AS HOME TERMINAL

FIG. 20B

TERMINAL OTHER THAN JOB INPUT TERMINAL ( HOME TERMINAL RESPONSE PROCESS )
↓
◇ DETECTION REQUEST RECEIVED ? — S95 NO ↑
↓ YES
◇ IS THERE REGISTERED USER INFORMATION STORED ? — S96 NO →
↓ YES
S97 TRANSMIT APPARATUS IDENTIFICATION INFORMATION
↓
( END )

INFORMATION-PROCESSING SYSTEM, METHOD FOR TRANSMITTING AND RECEIVING DATA, IMAGE-PROCESSING APPARATUS SUITED ESPECIALLY FOR TRANSMITTING AND RECEIVING DATA AMONG A PLURALITY OF IMAGE-PROCESSING APPARATUSES CONNECTED TO NETWORK

This application is based on Japanese Patent Application No. 2006-49408 filed with Japan Patent Office on Feb. 24, 2006, the entire content of which is hereby incorporated by reference.

BACKGROUND OF THE INVENTION

1. Field of the Invention

The present invention relates to an information-processing system, a method for transmitting and receiving data, and an image-processing apparatus. More specifically, the invention relates to an information-processing system, a method for transmitting and receiving data, and an image-processing apparatus that are suited especially for transmitting and receiving data among a plurality of image-processing apparatuses connected to a network.

2. Description of the Related Art

In recent years, an image-processing apparatus such as a scanner, a printer, or a facsimile is commonly used in the form of being connected to a network. In such form of use, there is known a technology for efficiently transmitting and receiving data among a plurality of image-processing apparatuses. Japanese Patent Application Publication No. 2003-179713 describes a data communication terminal having a storing portion that is capable of storing data based on a text image and has a plurality of saving areas. In each of the saving areas, attributes required for transmission on a communication line are set. The attributes include at least a transmission destination, a transmission instruction of a predetermined sentence to the transmission destination, and the maximum amount of transmission to the transmission destination. After completion of storing of the data in one of the plurality of saving areas, it is judged whether the capacity of the data exceeds the maximum amount of transmission to the transmission destination included in the attributes of the saving area in which the data is stored. Then the judgment result is notified.

However, the data communication terminal described in the 2003-179713 publication judges, after data is stored in the storing portion, whether the capacity of the data exceeds the maximum amount of transmission to the transmission destination included in the attributes of the saving area in which the data is stored, and the data is stored regardless of whether the data is transmitted or not. Since the amount of data storable is limited, if all data is stored in the transmission source, problems occur including a decrease in the amount of capacity available for storing.

SUMMARY OF THE INVENTION

The present invention has been accomplished to solve the above problems, and it is an object of the present invention to provide an information-processing system capable of storing data transmitted and received among a plurality of image-processing apparatuses connected to a network.

It is another object of the present invention to provide a method for transmitting and receiving data, the method being capable of storing data transmitted and received among a plurality of image-processing apparatuses connected to a network.

It is still another object of the present invention to provide an image-processing apparatus capable of storing data transmitted and received among a plurality of image-processing apparatuses connected to a network.

According to one aspect of present invention, there is provided an information-processing system including a plurality of image-processing apparatuses each connected to a network, the information-processing system comprising: a designation unit to designate an arbitrary destination user as a receiver of data; a specifying unit to specify an image-processing apparatus among the plurality of image-processing apparatuses, the destination user designated by the designation unit belonging to the specified image-processing apparatus; and a control unit to control switching between a first mode and a second mode in accordance with a predetermined condition, the first mode being for storing the data in a predetermined storing device on the network so as to enable reading of the data by an operation by the destination user designated by the designation unit, the second mode being for, instead of storing the data in the predetermined storing device, transmitting the data to the image-processing apparatus specified by the specifying unit, the destination user belonging to the specified image-processing apparatus.

According to this aspect, it is made possible to provide an information-processing system capable of efficiently storing data transmitted and received among a plurality of image-processing apparatuses connected to a network.

According to another aspect of the present invention, there is provided a method for transmitting and receiving data, the method being executed in an information-processing system including a plurality of image-processing apparatuses each connected to a network, the method comprising: a designating step to designate an arbitrary destination user as a receiver of the data; a specifying step to specify an image-processing apparatus among the plurality of image-processing apparatuses, the destination user designated in the designating step belonging to the specified image-processing apparatus; and a controlling step to control switching between a first mode and a second mode in accordance with a predetermined condition, the first mode being for storing the data in a predetermined storing device on the network so as to enable reading of the data by an operation by the destination user designated in the designating step, the second mode being for, instead of storing the data in the predetermined storing device, transmitting the data to the image-processing apparatus specified in the specifying step, the destination user belonging to the specified image-processing apparatus.

According to this aspect, it is made possible to provide a data transmitting/receiving method capable of efficiently storing data transmitted and received among a plurality of image-processing apparatuses connected to a network.

According to still another aspect of the present invention, there is provided an image-processing apparatus connected to a plurality of image-processing apparatuses via a network, the image-processing apparatus comprising: a designation unit to designate an arbitrary destination user as a receiver of data; a specifying unit to specify an image-processing apparatus among the plurality of image-processing apparatuses, the destination user designated by the designation unit belonging to the specified image-processing apparatus; and a control unit to control switching between a first mode and a second mode in accordance with a predetermined condition, the first mode being for storing the data in a predetermined storing device on the network so as to enable reading of the data by an operation by the destination user designated by the designation unit, the second mode being for, instead of storing the data in the predetermined storing device, transmitting the data to the image-processing apparatus specified by the specifying unit, the destination user belonging to the specified image-processing apparatus.

According to this aspect, it is made possible to provide an image-processing apparatus capable of efficiently storing data transmitted and received among a plurality of image-processing apparatuses connected to a network.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a flow chart of an example of the flow of initial setting processing.

FIG. 3B is a flow chart of an example of the flow of initial connection processing.

FIGS. 4A-4D are diagrams for describing registered user information. FIGS. 4E and 4F are diagrams for describing first and second user data.

FIG. 8 is a diagram showing an example of the format of job attribute information.

FIG. 15 is a flowchart showing an example of the flow of job input processing executed at the job input terminal in a second embodiment.

FIG. 17A is a diagram for describing first user data according to a third embodiment.

FIG. 17B is a diagram for describing second user data according to the third embodiment.

FIG. 18 is another flowchart showing the flow of job input processing executed at the job input terminal.

FIG. 19 is a diagram showing an example of the format of job attribute information according to the third embodiment.

FIG. 20A is a flowchart showing an example of the flow of home-terminal-detection processing.

FIG. 20B is a flowchart showing an example of the flow of home-terminal-response processing.

DESCRIPTION OF THE PREFERRED EMBODIMENTS

Figure 1:
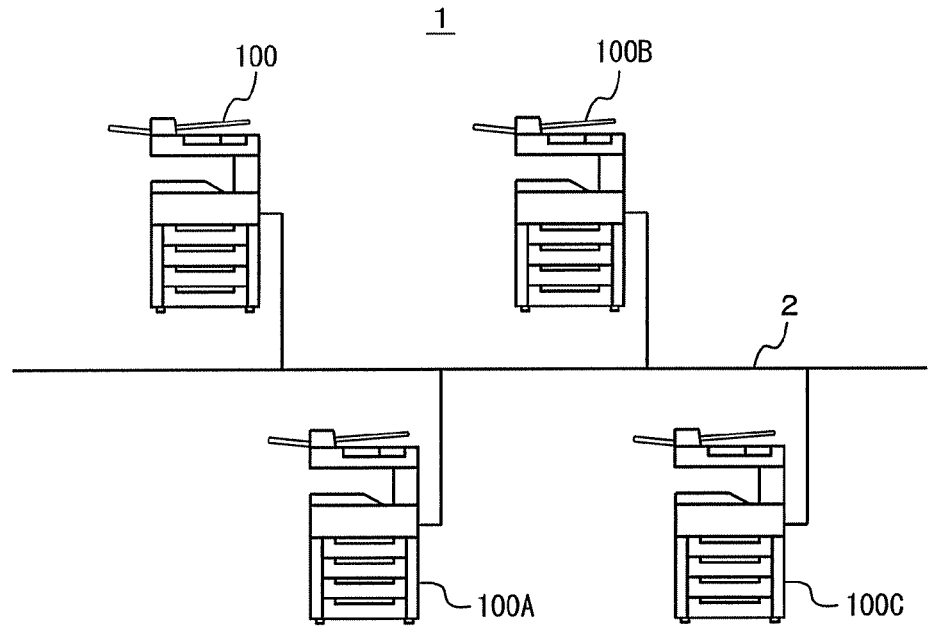
FIG. 1 is a schematic diagram of an image-processing system according to an embodiment of the present invention.

Embodiments of the present invention will be described below referring to the drawings. In the following description, parts having like functions and names will be denoted with like numerals, and therefore description thereof will not be repeated.

<First Embodiment>

FIG. 1 is a schematic diagram of an image-processing system according to an embodiment of the present invention. Referring to FIG. 1, an image-processing system 1 includes compound machines (hereinafter referred to as MFPs) 100, 100A, 100B, and 100C each connected to a network 2. The MFPs 100, 100A, 100B, and 100C have the same structures and functions, and therefore the MFP 100 will be taken as an example here unless stated otherwise.

The MFP (Multi Functional Peripheral) 100 includes a scanner to read text, an image-forming portion to form, on the basis of image data, an image on a recording medium such as paper sheet, and a facsimile. The MFP 100 is equipped with the image reading function, copying function, and facsimile-transmitting-and-receiving function. While in this embodiment the MFP 100 is taken as an example, the MFP 100 can be replaced with, for example, a scanner, an image-forming apparatus, a facsimile, and a computer.

The network 2 is a local area network (LAN), and the connection can be either by wire or radio. Also, the network 2 is not limited to a LAN and can be a wide area network (WAN), the public switched telephone network (PSTN), the Internet, or the like.

Figure 2:
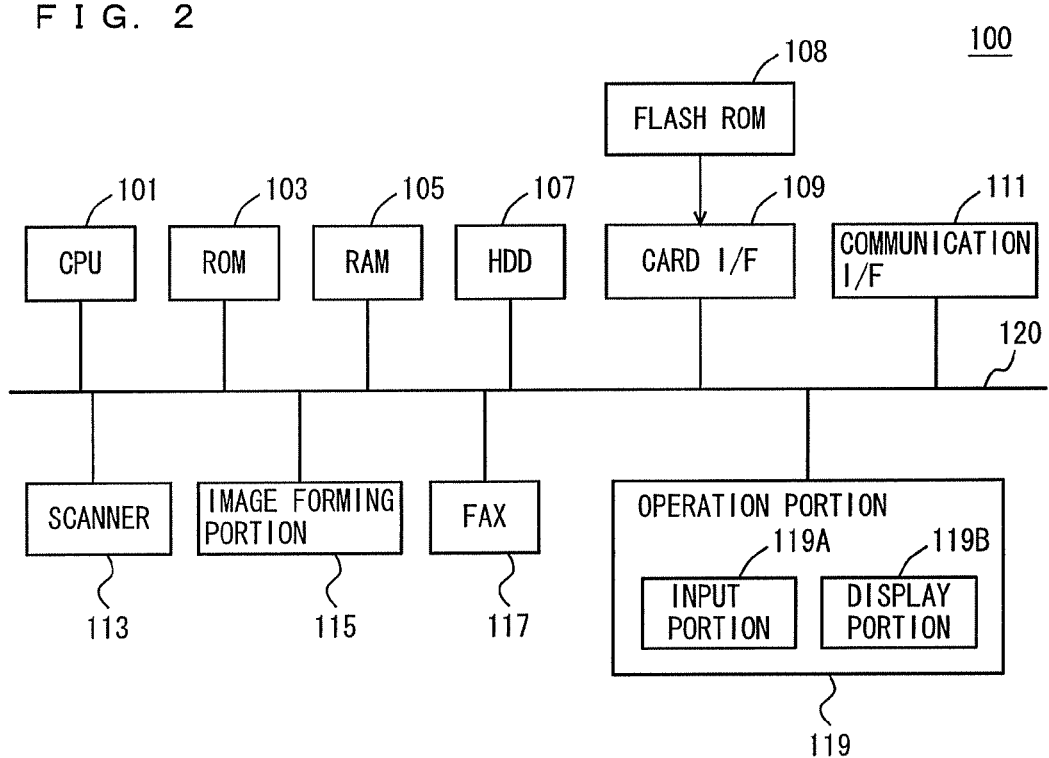
FIG. 2 is a block diagram showing an example of the hardware of an MFP 100 according to an embodiment of the present invention.

FIG. 2 is a block diagram showing an example of the hardware of the MFP 100 according to this embodiment. Referring to FIG. 2, the MFP 100 includes, respectively connected to a bus 120, a central processing unit (CPU) 101, a ROM (Read Only Memory) 103 that stores a program or the like to be executed at the CPU 101, a RAM (Random Access Memory) 105 for loading a program to be executed and for storing data during execution of the program, a hard disk drive (HDD) 107 for storing data in a nonvolatile manner, a card interface (I/F) 109 to which a flash ROM 108 is attached, a communication I/F 111 for connecting the MFP 100 to the network 2, a scanner 113, an image forming portion 115, a facsimile (FAX) 117, and an operation portion 119 as an interface with a user.

The CPU 101 loads into the RAM 105 and executes a data transmitting/receiving program stored in the flash ROM 108 attached to the card I/F 109. Moreover, the program executed at the CPU 101 is not limited to the data transmitting/receiving program stored in the flash ROM 108, and a program stored in an EEPROM (Electrically Erasable/Programmable Read Only Memory) connected additionally to the CPU 101 can be loaded into the RAM 105 and be executed. The use of an EEPROM makes it possible to rewrite or additionally write a data transmitting/receiving program. Thus, a computer connected to the network 2 can rewrite the data transmitting/receiving program stored in the EEPROM of the MFP 100 or additionally write a new data transmitting/receiving program into the EEPROM. Furthermore, the MFP 100 can download a data transmitting/receiving program from a computer connected to the network 2 and store the data transmitting/receiving program in an EEPROM.

These programs are not limited to the case of being read from the flash ROM 108 and executed. It can be a program stored in the ROM 103 that is read. It is also possible that an EEPROM is connected to the CPU 101 and a program read from the flash ROM 108 is stored in the EEPROM so that the program is read and executed. It is further possible that the HDD 107 temporality stores a data transmitting/receiving program stored in the flash ROM so that the program is loaded from the HDD 107 into the RAM 105 and executed.

The program referred to here not only includes a program directly executable by the CPU 101, but also a program in a source program format, a compressed program, an encrypted program, and the like.

The image forming portion 115 is a laser printer, an ink jet printer, or the like, and makes image data visible on recording media such as a sheet of paper. The scanner 113 includes a photoelectric transducer such as a CCD (Charge Coupled Device) and the like, and optically reads a sheet of original manuscript and outputs electronic data that is the image data. The FAX 117 transmits and receives the image data according to the facsimile protocol via the public switched telephone network (PSTN).

The operation portion 119 includes an input portion 119A and a display portion 119B. The input portion 119A is an input device such as a touch panel, a keyboard, or a mouse for accepting an input of operation by a user of the MFP 100. The display portion 119B is a liquid crystal display or an organic EL (Electro-Luminescence) display panel. When using a touch panel formed of a transparent member for the input portion 119A, the touch panel is provided overlapping with the display portion 119B so that an instruction of a button displayed on the display portion 119B can be detected. Thus, input of a variety of operations becomes possible.

The communication I/F 111 is a communication interface for connecting the MFP 100 to the network 2. Thus, it becomes possible for the MFP 100 to communicate with the other MFPs 100A, 100B, and 100C. Although the MFP 100 is connected to the other MFPs 100A, 100B, and 100C via the network 2, it can also be connected directly using a serial interface or a parallel interface. The communication I/F 111 uses an interface that corresponds to the form of connection between the MFP 100 and the other MFPs 100A, 100B, and 100C.

The input of data into the MFP 100 includes the following cases: (1) when the scanner 113 scans a sheet of original manuscript and the image data is inputted; (2) when image data is received from a computer or from any of the other MFPs 100A, 100B, and 100C connected to the network 2 via the communication I/F 111; (3) when image data stored in the flash ROM 108 is read via the card I/F 109; and (4) when facsimile data is received in the FAX 117.

The output of data from the MFP 100 includes the following cases: when the data stored in the HDD 107 is (1) made visible on recording media such as a sheet of paper by the image forming portion 115, (2) transmitted to a computer or to any of the other MFPs 100A, 100B, and 100C connected to the network 2 via the communication I/F 111, (3) stored in the flash ROM 108, (4) outputted as facsimile data by the FAX 117, and (5) displayed on the display portion 119B.

Moreover, storage media that stores data transmitting/receiving program is not limited to the flash ROM 108 and can also be the media that records a program in a fixed manner, such as a flexible disk, a cassette tape, an optical disk [MO (Magnetic Optical Disc)/MD (Mini Disc)/DVD (Digital Versatile Disc)], an IC card (including a memory card), an optical card, and a semiconductor memory such as a masked ROM, an EPROM, an EEPROM, and the like.

In the image-processing system 1 according to this embodiment, with each of the MFPs 100, 100A, 100B, and 100C, a user who mainly uses the apparatus is fixed. Thus, each of the MFPs 100, 100A, 100B, and 100C stores registered user information in order to register the user who mainly uses each. The registered user information, which will be described later, includes at least user identification information for identifying a user. The name of the user can be used as the user identification information. Here, based on the user, any one or more of the MFPs 100, 100A, 100B, and 100C which store the registered user information of that user are referred to as "home terminals." For instance, if the registered user information of the user "David" is stored in the MFP 100, a home terminal of the user "David" is the MFP 100. Moreover, registered user information is stored in each of the MFPs 100, 100A, 100B, and 100C to define a user who mainly uses the apparatus but not to prohibit a user whose registered user information is not stored therein from using it.

Here, the case in which the MFP 100 is connected anew to the network 2 where MFPs 100A, 100B, and 100C are already connected is considered. For the MFP 100, it is necessary to set apparatus identification information for identifying the MFP 100 and the above-described registered user information. When the apparatus identification information and the registered user information are set for the MFP 100, then the MFP 100 transmits the apparatus identification information and the registered user information to the other MFPs 100A, 100B, and 100C. Thus, an image-processing system 1 is constructed among the MFPs 100, 100A, 100B, and 100C.

FIG. 3A is a flowchart showing an example of the flow of initial setting processing. The initial setting processing is executed in the MFP 100 when the MFP 100 is newly connected to the network 2. FIG. 3B is a flowchart showing an example of the flow of connection processing. The connection processing is executed in each of the MFPs 100A, 100B, and 100C when the MFP 100 is newly connected to the network 2. The initial setting processing and connection processing are implemented when an initial setting program and a connection program stored in the flash ROM 108 are loaded into the RAM 105 and executed at the CPU 101 in each of the MFPs 100, 100A, 100B, and 100C. An initial setting program and a connection program are a part of the image-processing program.

Referring to FIG. 3A, terminal information is registered in the MFP 100 (step S01). When the user inputs the terminal information into the operation portion 119 according to the terminal registration screen displayed on the display portion 119B, the terminal information is accepted and registered in the MFP 100. The terminal information at least includes apparatus identification information for identifying the MFP 100. The apparatus identification information is preferably location information assigned to the MFP 100 in the network 2, and is here an IP (Internet Protocol) address. The terminal information can include information showing the location where the MFP 100 is disposed.

Next, the registered user information of the user who uses the MFP 100 as the user's home terminal is inputted into the MFP 100 (step S02). When the user inputs the registered user information into the operation portion 119 according to the registered-user-information input screen displayed on the display portion 119B, the registered user information is accepted and registered in the MFP 100. When a plurality of users use the MFP 100 as each's home terminal, the registered user information of each of the plurality of users is inputted. The registered user information at least includes user identification information for identifying the user. The user identification information needs only to be unique information such as a user ID including characters or symbols and the name of the user. Here, a user name is used as the user identification information. The registered user information can also include accompanying information and authentication information in addition to the user identification information.

Upon completing the user registration information after the user inputs the terminal information, the user instructs on a finish button displayed on the display portion 119B with input portion 119A so that the completion of the initial setting is detected in MFP 100. Moreover, the registration of the terminal information in step S01 and the input of the registered user information in step S02 are normally performed by an administrator of the terminal.

Then, it is determined whether the initial setting is completed or not (step S03). If the initial setting is completed, the processing proceeds to step S04, and if it is not completed, the processing goes back to step S01. In step S04, the terminal information and the registered user information for which initial setting is already performed are transmitted to the terminals in the same group. The same group refers to the set of terminals which form the image-processing system 1. Here, MFPs 100, 100A, 100B, and 100C connected to the network 2 are considered to be of the same group. Thus, by transmitting an inquiry by broadcast on the network 2, the MFP 100 receives the IP addresses of terminals respectively transmitted from the MFPs 100A, 100B, and 100C in response to the inquiry. In this manner, the IP addresses of the terminals that form the same group are obtained. Moreover, by grouping, a plurality of terminals connected to the network 2 can be divided into different groups. For instance, the MFPs 100 and 100A can form one group, while the MFPs 100B and 100C can form another group. Such grouping is set by a user. More specifically, as described above, the MFP 100 receives the IP addresses of the MFPs 100A, 100B, and 100C connected to the network 2 and detects the MFPs 100A, 100B, and 100C, and the user designates which of the MFPs 100A, 100B, and 100C should be in the same group as the MFP 100.

The MFP 100 transmits terminal information and registered user information to one terminal selected from the MFPs 100A, 100B, and 100C set as the same group. An example is described in which the MFP 100A is selected, and the terminal information and the registered user information of the MFP 100 are transmitted from the MFP 100 to the MFP 100A.

Now, referring to FIG. 3B, the MFP 100A receives the terminal information and the registered user information of the MFP 100 transmitted from the MFP 100 (step S11). In response to this reception, the MFP 100A transmits to the MFP 100 the terminal information and the registered user information stored in the HDD 107 of the MFP 100A (step S12). That is, the connection processing is executed on condition that the MFP 100A receives a demand from the MFP 100 executing the initial setting processing. In the next step S13, the MFP 100A generates user data from the terminal information and registered user information of the MFP 100 received in step S11. The MFP 100A then adds the generated user data to the user data already stored in the HDD 107.

Referring back to FIG. 3A, the MFP 100 receives the terminal information and the registered user information of the MFP 100A transmitted from the MFP 100A (step S05). Then, it is determined whether a terminal to which the terminal information and the registered user information have not yet been transmitted exists among the terminals of the same group (step S06). If such a terminal exists, that terminal is selected and the process goes back to step S04, but if not, the processing proceeds to step S07. Here, since the terminal information and the registered user information are not yet transmitted to the MFPs 100B and 100C, either of these two is selected and the processing goes back to step S04. Thus, the MFP 100 transmits its terminal information and registered user information to the terminals of the same group one by one (step S04), and receives from each terminal the terminal information and the registered user information of that terminal (step S05). Moreover, although, here, the terminals of the same group are selected one by one and the terminal information and the registered user information are transmitted accordingly, the terminal information and the registered user information can be transmitted by broadcast, and the terminal information and the registered user information stored in the MFPs 100A, 100B, and 100C can be received from the MFPs 100A, 100B, and 100C, respectively.

In step S07, it is determined whether the registered user information of its own apparatus, i.e., the MFP 100 itself, is to be used for user data generation. This determination can be based on selection made by a user, or it can be predetermined. If the registered user information of the MFP 100 itself is to be used, the processing proceeds to step S08, and if it is not to be used, step S08 is skipped and the processing proceeds to step S09. In step S08, the registered user information stored in MFP 100 is read. Then, in step S09, the user data is generated from the terminal information and the registered user information. When step S08 is skipped, user data are generated each from registered user information and terminal information received from each of the MFPs 100A, 100B, and 100C. When step S08 is executed, user data are generated from the registered user information and terminal information received from the MFPs 100A, 100B, and 100C and the registered user information and terminal information stored in the MFP 100, and from the terminal information of the MFPs 100, 100A, 100B, and 100C. The user data includes the terminal information and the registered user information. Moreover, although the user data includes the terminal information and the registered user information in this embodiment, the user data needs only to include at least the registered user information. As for the generated user data, if it is determined in step S07 that the registered user information of the MFP 100 itself is to be used, the generated user data will be referred to as first user data, and if it is determined in step S07 that the registered user information of the MFP 100 itself is not to be used, the generated user data will be referred to as second user data. Then, the generated user data is stored in the HDD 107.

When the first user data is generated in all of the MFPs 100, 100A, 100B, and 100C, the stored user data in all of the MFPs 100, 100A, 100B, and 100C become identical. On the other hand, when the second user data is generated in the MFP 100A, that second user data includes user data that has the terminal information the MFPs 100, 100B, and 100C respectively associated with the registered user information stored in the MFPs 100, 100B, and 100C, and when the second user data is generated in the MFP 100B, that second user data includes user data that has the terminal information of the MFPs 100, 100A, and 100C respectively associated with the registered user information stored in the MFPs 100, 100A, and 100C, and when the second user data is generated in the MFP 100C, that second user data includes user data that has the terminal information of the MFPs 100, 100A, and 100B respectively associated with the registered user information stored in the MFPs 100, 100A, and 100B.

Moreover, here, while the registration of the terminal information and the input of the registered user information are performed in the initial setting processing executed in the MFP 100, similar processing to this initial setting processing is executed in the case where the MFP 100 is already connected to the network 2 and a user is to be added. In such a case, however, the registration process of the terminal information of step S01 is not required.

In addition, the initial setting process can be performed not only when the MFPs 100, 100A, 100B, and 100C are connected to the network 2 but also after the power is turned on for the MFPs 100, 100A, 100B, and 100C, or at prescribed time intervals. For instance, when a new user is registered in the MFP 100, the registered user information of the newly registered user is transmitted to the other MFPs 100A, 100B, and 100C to allow the other MFPs to store the latest user data. In this case, the MFP 100 executes the input processing of the registered user information of step S02 without executing step S01 and step S03 of the initial setting processing shown in FIG. 3A. Contrarily, the MFP 100 can obtain the registered user information of a user newly registered in the other MFPs 100A, 100B, and 100C and store the latest user data. In this case, the MFP 100 makes a request for transmission of the registered user information to the other MFPs 100A, 100B, and 100C without executing steps S01 to S03 of the initial setting processing shown in FIG. 3A. This transmission request for the registered user information at least includes apparatus identification information. In response to this transmission request, the other MFPs 100A, 100B, and 100C execute the connection processing shown in FIG. 3B, and in step S11 in response to the transmission request received, transmit the registered user information stored in their respective HDDs 107 to the MFP 100, which has transmitted the transmission request. Thus, even when the registered user information stored in HDDs 107 of the other MFPs 100A, 100B, and 100C is altered, user data will be generated from the altered registered user information and stored in the HDD 107. In this case, there is no need for the MFPs 100A, 100B, and 100C to execute step S13 in the connection processing.

FIG. 4A is a diagram showing an example of registered user information stored in the MFP 100, FIG. 4B is a diagram showing an example of registered user information stored in the MFP 100A, FIG. 4C is a diagram showing an example of registered user information stored in the MFP 100B, and FIG. 4D is a diagram showing an example of registered user information stored in the MFP 100C. The registered user information includes user identification information, accompanying information, authentication information, and a forced reception flag. The accompanying information is the information related to a user, such as the name of the division the user belongs to, an electronic mail address assigned to that user, face image data obtained by photographing the face of that user, and so on. The authentication information is the information used for authentication of the user at log-in, and here, a password is used. It is also possible to use the face image data as the authentication information. When biometrics authentication is used, a fingerprint, sound spectrogram, iris, vein pattern, and the like are used. The forced reception flag is a flag for setting data transmitted for the user to be stored in the home terminal of the user. When the user wants such data to be stored in the user's home terminal, the forced reception flag is turned on, and otherwise, turned off.

Furthermore, FIG. 4E is a diagram showing an example of first user data, and FIG. 4F is a diagram showing an example of second user data stored in the MFP 100A. The first data or second data is generated and stored in each of the MFPs 100, 100A, 100B, and 100C when the initial setting processing shown in FIG. 3A is executed in the MFP 100 and the connection processing shown in FIG. 3b is executed in each of the MFPs 100A, 100B, and 100C. The first user data and second user data include a number, registered user information, apparatus identification information of a home terminal, and the location where the home terminal is disposed. The user data need only to include at least the user identification information, the apparatus identification information of a home terminal, and a forced reception flag.

Although an example in which the electronic mail address assigned to a user is saved as accompanying information is illustrated in the above-described embodiment, the method of transmission and reception of image data is not limited to the use of electronic mail, and a facsimile transmission, an FTP (File Transfer Protocol), or the like can be used. In such cases, information suited for the method of transmission and reception of the image data would be saved.

In this manner, when the initial setting process is executed in the MFP 100, the same first user data is generated and stored in the MFPs 100, 100A, 100B, and 100C, which are set to be of the same group, or second user data including all of the registered user information of the other terminals of the same group is generated. Thus, the image-processing system 1 constructed by the MFPs 100, 100A, 100B, and 100C is formed. When image-processing system 1 is formed, the user who uses one of the MFPs 100, 100A, 100B, and 100C as the user's home terminal can be specified based on the user data so that data transmission and reception among users can be performed using the user data. The processing executed at the MFPs 100, 100A, 100B, and 100C for such data transmission and reception is herein referred to as a job. Moreover, the data transmission and reception performed by execution of such a job is called BOX transmission and reception.

A user inputs a job at one of the MFPs 100, 100A, 100B, and 100C in order to transmit data. Moreover, when a job whose destination is the user himself exists, the user instructs any one of the MFPs 100, 100A, 100B, and 100C to execute the job and thus to output the data. Hereinafter, MFPs 100, 100A, 100B, and 100C into which a job is inputted is referred to as job input terminals, and MFPs 100, 100A, 100B, and 100C from which a job is outputted is referred to as job output terminals. Here, to simplify the description, the example will be illustrated in which the user of user identification information "David" inputs at the MFP 100 the job of transmitting image data to the destination of user identification information "Julie." In this case, the MFP 100 is a job input terminal and executes job input processing. The MFP 100 that executes the job input processing executes the processing of authenticating the user in response to a log-in request by the user "David," and thereafter executes job setting processing. Moreover, although the example of executing the job input processing at a home terminal is described here, the job input processing can also be executed at a terminal other than the home terminal.

Figure 5:
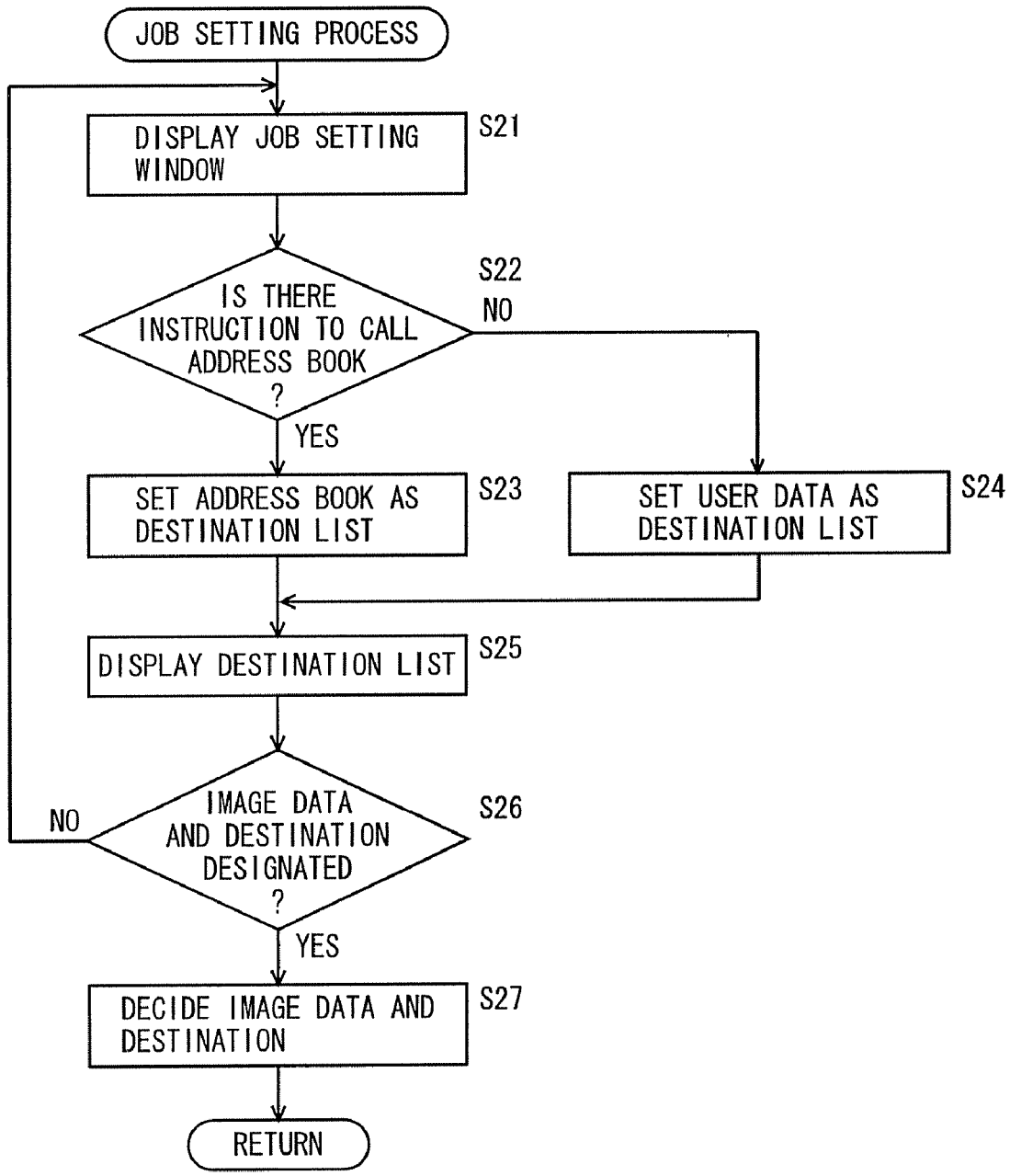
FIG. 5 is a flowchart showing an example of the flow of job setting processing.

FIG. 5 is a flow chart showing an example of the flow of the job setting processing. The job setting processing is implemented by having a job setting program that is stored in the flash ROM 108 loaded into the RAM 105 of the MFP 100 and executed at the CPU 101. The job setting program is a part of a data transmitting/receiving program. Moreover, it is prerequisite that the user "David" is logged into the MFP 100 prior to the execution of the job setting program. This is to allow the MFP 100 to specify the user who operates it.

Referring to FIG. 5, in the job setting processing, a job setting screen is displayed on the display portion 119B (step S21). The job setting window is a window for setting data to be transmitted, a destination of the transmission, and a method of transmission. Moreover, the method of transmission (communication protocol such as electronic mail and facsimile communication) can be designated on the side where the image data is received. The job setting window will be described later. Then, it is determined whether a call instruction to call an address book is inputted or not (step S22). If a call instruction is inputted, the processing proceeds to step S23, and if it is not inputted, the processing proceeds to step S24. The address book is unique data of the user that is stored in advance in association with the log-in user, or here, with the user identification information "David." The address book includes at least user identification information and apparatus identification information of a home terminal of that user. The address book can include an electronic mail address. Further, the address book can include a facsimile number. In step S23, the address book is read and is set as a destination list. In step S24, user data is read, and the user data is set as the destination list. In this case, it is not required to generate the destination list anew, and the destination list can be displayed even when an address book does not exist. Then, the destination list is displayed on the job setting screen (step S25).

Further, it is determined whether or not the image data to be transmitted and the destination are designated in the job setting screen (step S26), and if they are designated, the processing proceeds to step S27, and if not, the processing goes back to step S21. In step S27, the image data and the destination designated in step S26 are decided to be the image data to be transmitted and the destination.

Figure 6:
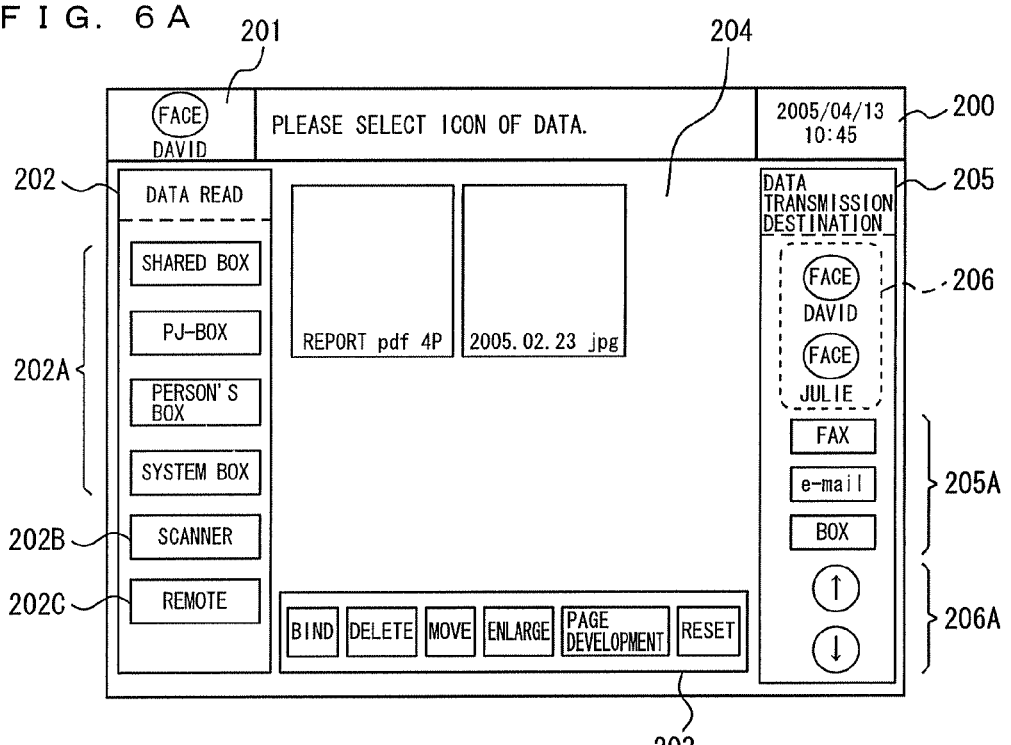
FIG. 6A is a diagram showing an example of a job setting screen.
FIG. 6B is a diagram showing an example of a sub-window.

FIG. 6A is a diagram showing an example of a job setting screen. Referring to FIG. 6A, a job setting screen 200 includes an area 201 for displaying information specifying an operator, an area 202 for accepting an input instruction or a selection instruction of data to be transmitted, an area 203 for instructing edition of data inputted or selected in the area 202, an area 204 for accepting designation of the image data to be transmitted, and an area 205 for accepting designation of the destination of the transmission and the method of transmission.

In the area 201, as the information to specify the log-in user "David" who is the operator, the user name "David" as the user identification information and the face image of David are displayed. Moreover, although the characters "FACE" are shown in the diagram for convenience, in practice the face image will be displayed.

The area 202 includes a button 202A for designating an area of the HDD 107, a button 202B for instructing input of image data from the scanner 113, and a button 202C for instructing input of image data from an image data input device. When the button 202A is instructed, a thumbnail that displays in reduction the image data stored in the area of HDD 107 corresponding to that button is displayed in the area 204. When the button 202B is instructed, the scanner 113 is activated and the thumbnail of image data outputted by the scanner 113 is displayed in the area 204. When the button 202C is instructed, image data from the image data input device is inputted, and the thumbnail of the inputted image data is displayed in the area 204. The image data input device is, for instance, a computer, an external storing apparatus, and the like connected to the network 2.

By the user's instruction on the thumbnail displayed in the area 204, the image data corresponding to the instructed thumbnail is designated by the MFP 100 as the image data to be the object of transmission. In addition, when the button displayed in the area 203 is instructed by the user, such processings as bind processing of putting together a plurality of image data, deletion processing of deleting the image data from the object of selection, move processing for changing the order, processing of enlarging the image data, page development processing of putting together a plurality of image data into one image data, and reset processing of canceling the instructed processing are executed using the image data designated in the area 204.

The area 205 is an area for setting a destination of transmission and a method of transmission. The area 205 includes an area 206 that displays a destination list for designating the destination of transmission, a button 205A for designating the method of transmission, and a button 206A for scrolling the display of the destination list. As a method of transmission, a facsimile transmission, an electronic mail (E-mail) transmission, or BOX transmission and reception can be designated. At least a part of the destination list is displayed in the area 206. As the destination list, either of the address book or the user data is set by the above-described job setting process. The destination list includes at least the user identification information. Thus, the user identification information is displayed in the area 206. Moreover, when the destination list includes a face image as accompanying information, that face image is displayed adjacent to the user identification information. Here, although two of the destinations included in the destination list are displayed in the area 206, it can be changed to display another destination by instructing on the button 206A.

Furthermore, by the user's instruction on the user identification information displayed in the area 206, the MFP 100 displays detailed information of the user in a sub-window. The sub-window is displayed on the job setting screen in an overlapping manner. The information displayed in the sub-window includes at least a part of the user data. FIG. 6B is a diagram showing an example of the sub-window. Referring to FIG. 6B, the sub-window includes, among the user data of the user identification information "David," the user identification information, division name, electronic mail address, and face image, and setting areas 211 and 212 for setting transmission conditions. The setting area 211 is an area for setting transmission conditions for forced transmission. When the user designates transmission conditions for forced transmission, the MFP 100 sets the home terminal of the destination user as the storing destination of the image data. The setting area 212 is an area for setting transmission conditions for forced printing. When the user designates transmission conditions for forced printing, the MFP 100 sets the conditions under which the home terminal of the destination user is made to print the image data.

[BOX Transmission and Reception]

In the image-processing system 1 according to this embodiment, the above-described job setting processing is executed when a job input process is executed at a job input terminal. Then, job management processing is executed in a home terminal of the user of the destination set by the job setting processing. Here, the user of the user identification information "David" transmits image data to the destination of user identification information "Julie" at a home terminal MFP 100 so that the job input processing is executed in the MFP 100 and the job management processing is executed in the MFP 100A, which is a home terminal of the user identification information "Julie." Furthermore, when "Julie," who is set to be the user of the destination, instructs output of the job at the home terminal MFP 100A or at the other terminals MFPs 100, 100B, and 100C, the job output processing is executed at that terminal. The terminal at which the output of a job is instructed is called a job output terminal. Here, the job output terminal is described as being the MFP 100B.

Figure 7:
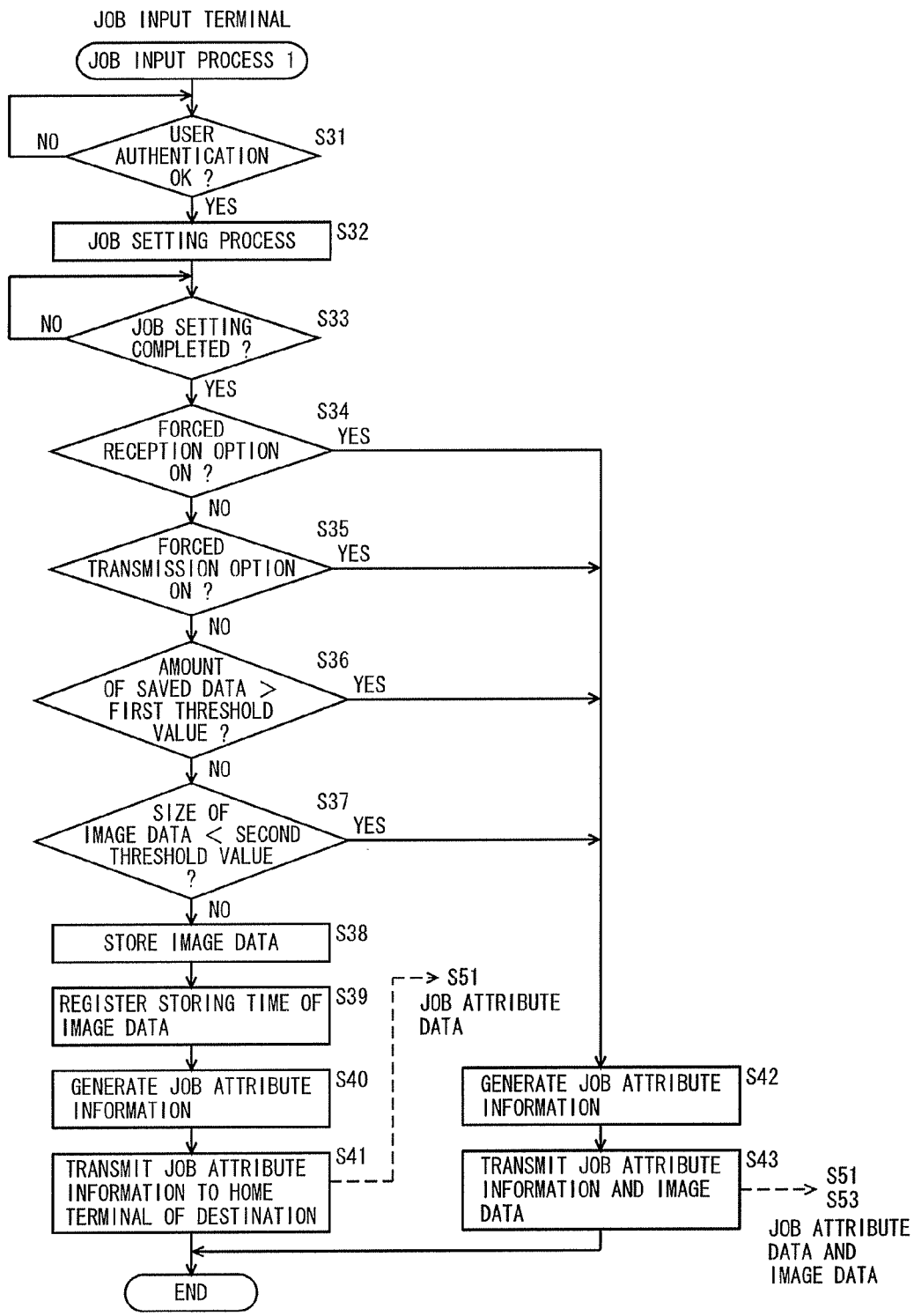
FIG. 7 is a flowchart showing the flow of job input processing executed at a job input terminal.

FIG. 7 is a flowchart showing the flow of the job input processing executed at the job input terminal. The job input processing is implemented by loading a job input program stored in the flash ROM 108 into the RAM 105 of the job input terminal and executing the job input program by the CPU 101.

Referring to FIG. 7, the MFP 100, which is the job input terminal, performs user authentication of the user of user identification information "David" (step S31). As a result of the user authentication, if the user is authenticated, log-in is permitted and the processing proceeds to step S32, but if not authenticated, log-in is not permitted and the processing goes back to step S31 and stands by. The authentication involves permitting log-in when the user identification information and a password inputted by the user exist in the user data stored in the HDD 107 and not permitting log-in when they do not exist. As described above, the user data includes the registered user information stored in the MFPs 100A, 100B, and 100C as well as that in the MFP 100 so that a user for whom the MFP 100 is not a home terminal can log into the MFP 100 as long as the user uses any of the MFPs 100A, 100B, and 100C as the user's home terminal.

In step S32, the job setting processing described using FIG. 5 is executed. Then, it is determined whether the setting of a job is completed or not. When the setting is completed, the processing proceeds to step S34, and if not completed, the process stands by until the setting is completed. The setting of the job is determined to have been completed when image data to be transmitted and the destination are decided by the job setting process.

In step S34, it is determined whether the forced reception option is set at "ON." Specifically, the determination is done by referring to the user data of the user of the destination designated in the job setting processing executed in step S32 and by using a forced reception flag of the user data. When the forced reception flag of the user data is "ON," the processing proceeds to step S42, and when "OFF," the processing proceeds to step S35. This is to comply with the determination of the destination user, who is the receiver of the image data. In step S35, it is determined whether the forced transmission option is set at "ON." Specifically, it is determined whether the forced transmission option has been set in the job setting processing executed in step S32. If transmission conditions for forced transmission are set in the setting area 211 of the sub-window shown in FIG. 6B, the processing proceeds to step S42. If no transmission conditions for forced transmission are set, the processing proceeds to step S36. This is to comply with the determination of the transmitter of the image data.

In step S36, it is determined whether the amount of saved data in the HDD 107 is above a first threshold value. If the amount of saved data in the HDD 107 is above the first threshold value, the processing proceeds to step S42, and if not above the first threshold value, the processing proceeds to step S37. This is to prevent storing of image data when the HDD 107 has a small amount of capacity available for storing. In step S37, it is determined whether the size of the image data determined to be transmitted by the job setting processing executed in step S32 is below a second threshold value. If the size of the image data is below the second threshold value, the processing proceeds to step S42, and if not below the second threshold value, the processing proceeds to step S38. This is because transmitting image data having a small data amount does not greatly affect the load of network communication.

In step S38, the image data that has been determined to be transmitted is stored in the HDD 107. Then, the time (storing time) at which the image data was stored is registered (step S39). In the registration, the storing time can be stored in such a manner that the storing time is associated with the image data as attribute data of the image data, or the storing time can be included in job attribute information described later. In step S35, job attribute information is generated. Thus, since the image data is stored in the HDD 107 of the MFP 100, the job attribute information generated in step S40 includes the apparatus identification information of the MFP 100 in the location information of the image data. Then, the generated job attribute information is transmitted to the MFP 100A, which is the home terminal of the destination user "Julie" (step S41).

In step S42, job attribute information is generated similarly to step S40. The generated job attribute information and the image data are transmitted to the MFP 100A, which is the home terminal of the destination user "Julie" (step S43).

By executing the job input processing, the image data that is designated by the user, in the job setting processing, as the image data to be transmitted is stored in a job input terminal, which is either the MFP 100 or the MFP 100A, which is the home terminal of the destination user "Julie." The job attribute information is stored in the MFP 100A, which is the home terminal of the destination user "Julie."

FIG. 8 is a diagram showing an example of the format of the job attribute information. Referring to FIG. 8, the job attribute information includes information of transmission origin, destination information, and image data information. The information of transmission origin is user identification information of a user who instructed the execution of the job input processing, who is, here, "David." The destination information includes user identification information of the user of the destination and apparatus identification information for identifying a home terminal of that user. Here, the user identification information of the destination information is "Julie" and the apparatus identification information is an IP address of the MFP 100A. The image data information includes the apparatus identification information of a terminal in which the image data information is stored and a file name stored in that terminal. Here, since the image data is stored in the HDD 107 of the job input terminal MFP 100, the job attribute information generated in step S40 shown in FIG. 7 includes the IP address of the MFP 100 set in the apparatus identification information of the image data, and in the file name, a direct path is set including information (for instance, a device name or a drive name) which specifies the HDD 107. For the job attribute information generated in step S42 shown in FIG. 7, since the image data is stored in the HDD 107 of the MFP 100A, which is the home terminal of the destination user "Julie," the IP address of the MFP 100A is set in the apparatus identification information of the image data information, and in the file name, a direct path is set including information which specifies the HDD 107. Thus, the image data information is the location information on the network 2 where the image data is stored, and has at least apparatus identification information (IP address of the apparatus). The image data information can be a URL (Uniform Resource Locator).

Figure 9:
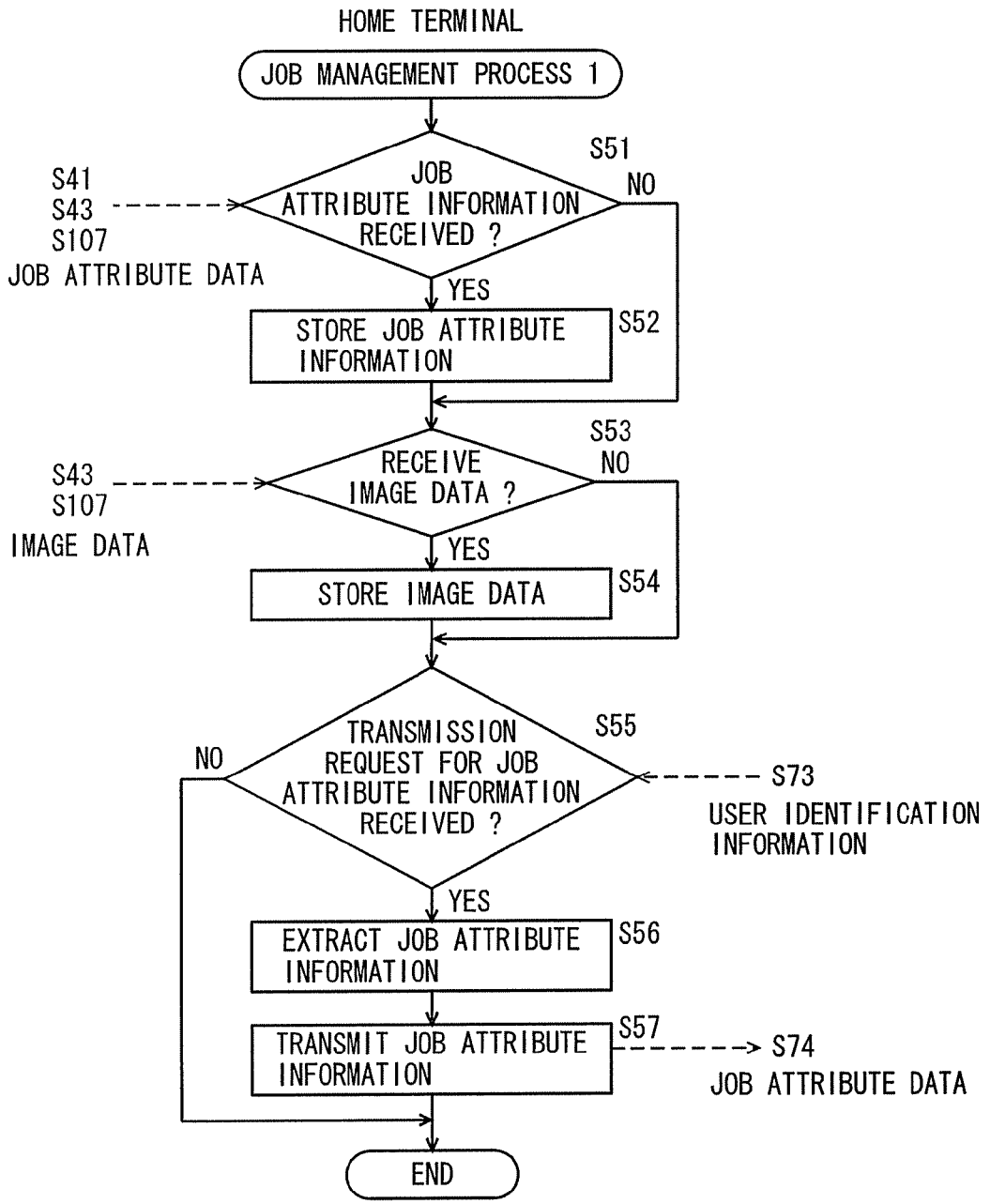
FIG. 9 is a first flowchart showing an example of the flow of job management processing executed by a home terminal.
Figure 10:
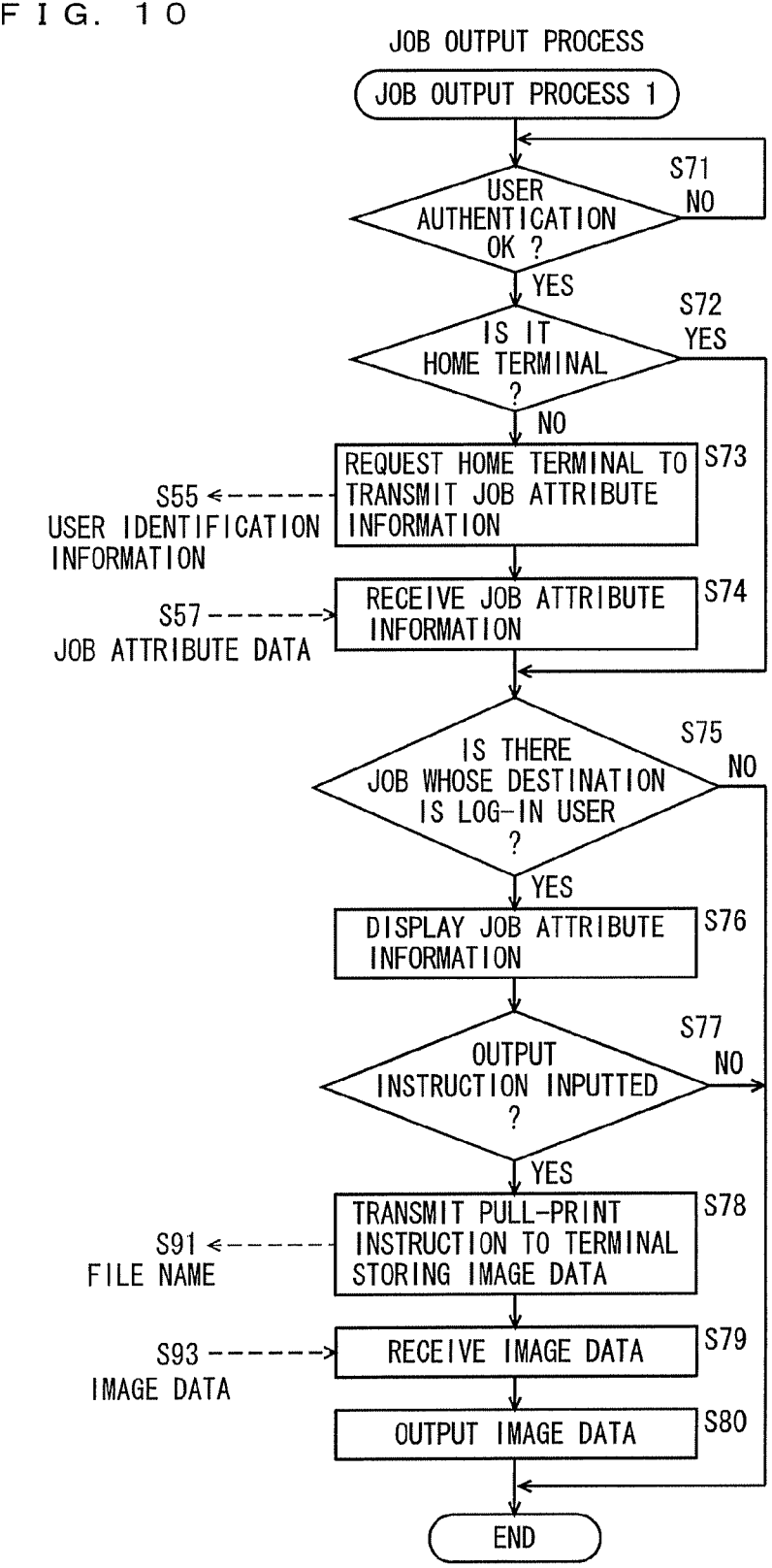
FIG. 10 is a flowchart showing an example of the flow of job output processing executed at a job output terminal.

FIG. 9 is a first flowchart showing an example of the flow of job management processing executed at a home terminal. The job management processing is implemented when a data transmitting/receiving program stored in the flash ROM 108 is loaded into the RAM 105 of the job output terminal and executed at the CPU 101. FIG. 10 is a flowchart showing an example of the flow of job output processing executed at a job output terminal. The job output processing is implemented when a data transmitting/receiving program stored in the flash ROM 108 is loaded into the RAM 105 of the job output terminal and executed at the CPU 101.

Referring to FIG. 9, it is determined whether or not job attribute information is received in the MFP 100A which is a home terminal (step S51). If the job attribute information is received, the processing proceeds to step S52, and if the job attribute information is not received, the processing proceeds to step S53. In step S52, the received job attribute information is stored in a prescribed area of the HDD 107. In step S53, it is determined whether or not image data is received. If the image data is received, the processing proceeds to step S54, and if not received, the processing proceeds to step S55. In step S54, the received image data is stored in a prescribed area of the HDD 107.

Next, referring to FIG. 10, in the MFP 100B which is the job output terminal, user authentication of the user of the user identification information "Julie" is performed (step S71). As a result of the user authentication, if the user is authenticated, log-in is permitted and the processing proceeds to step S72, but if not authenticated, log-in is not permitted and the processing stands by. In other words, the job output processing is executed on condition that at least user identification information is inputted at the job output terminal. As described above, the user data includes registered user information stored in MFPs 100, 100A, and 100C as well as that in MFP 100B, which is the home terminal, so that a user for whom the MFP 100B is not a home terminal can log into the MFP 100B as long as the user uses any of the MFPs 100, 100A, and 100C as the user's home terminal.

Thus, in step S72, it is determined whether the MFP 100B which is the job output terminal is a home terminal of the user of the user identification information "Julie" or not. If it is the home terminal, the processing proceeds to step S75, but if not, the processing proceeds to step S73. Here, the MFP 100B is not a home terminal of the user of the user identification information "Julie" so that the processing proceeds to step S73. In step S73, a request for transmission of job attribute information is transmitted to the MFP 100A, which is a home terminal of the user of the user identification information "Julie." This transmission request includes the user identification information "Julie."

Referring to FIG. 9, in step S55, it is determined whether the transmission request for the job attribute information is received or not. If it is received, the processing proceeds to step S56, and if it is not received, the processing is ended. In step S56, using the user identification information included in the transmission request, the job attribute information including that user identification information is extracted from the job attribute information stored in the HDD 107. In the case where a plurality of corresponding job attribute information exist in the HDD 107, all of the corresponding job attribute information is extracted. Then, the extracted job attribute information is transmitted to the job output terminal that transmitted the transmission request (step S57). Moreover, if no corresponding job attribute information is extracted in step S56, information which indicates that the job attribute information does not exist is transmitted to the job output terminal.

Referring to FIG. 10, job attribute information is received according to the transmission request transmitted in step S73 (step S74). If the information which indicates that the job attribute information does not exist is received, the processing proceeds directly to step S75.

In the next step, S75, it is determined whether a job whose destination is the user of the user identification information "Julie," who is the log-in user, exists or not. This determination is made based on whether the job attribute information exists or not. If the job output terminal is not a home terminal, the determination is made based on whether the information which indicates that the job attribute information does not exist is received in step S74 or not. If such information is received, the processing is ended as having no job. If the job attribute information is received in step S74, the processing proceeds to step S76. On the other hand, in the case where the job output terminal is a home terminal, job attribute information which includes the user identification information "Julie," who is the log-in user, is extracted from the job attribute information stored in the HDD 107. If such job attribute information is extracted, the processing proceeds to step S76 as having a job, and if it is not extracted, the processing is ended.

In step S76, the job attribute information including the user identification information "Julie," who is the log-in user, is displayed on the display portion 119B. Of the job attribute information, at least the user identification information of the destination information is displayed. The user identification information of the information of transmission origin and a file name of image data information can also be displayed. This is to allow the user to use as reference and to understand whom the transmitted image data was transmitted from and its content.

Then, it is determined whether an output instruction is inputted or not (step S77). If such an instruction is inputted, the processing proceeds to step S78, and if not, the processing is ended. In step S78, a pull-print instruction is transmitted to a terminal specified by the apparatus identification information of the image data information of the job attribute information. A pull-print instruction is an instruction requesting a transmission of image data. Here, the image data is stored in the job input terminal so that the pull-print instruction would be transmitted to the MFP 100, which is the job input terminal. The pull-print instruction at least includes a file name of the image data information of the job attribute information.

In step S79, the image data transmitted in response to the transmission of the pull-print instruction transmitted in step S78 is received. Then, the received image data is outputted (step S80). The output is performed by a method according to the designation made by the user "Julie."

Moreover, there is a case where a job output terminal is also used as a job input terminal or a home terminal that receives image data from the job input terminal (step S53 shown in FIG. 9). In such a case, the image data is stored in the HDD 107 of the job output terminal. Thus, when obtaining such image data, instead of transmitting the pull-print instruction in step S78, the job output terminal reads from the HDD 107 the image data specified by the file name of the image data information of the job attribute information. In this case, step S79 is not required. The expressions transmission of image data and/or reception of image data refer to exchanges of image data including an exchange of image data within the same terminal. In addition, while the above-described example illustrates the transmission and the reception of image data being performed using a pull-print instruction, a transmission instruction by electronic mail given by a receiver of the image data or a facsimile transmission instruction can be used, instead.

Figure 11:
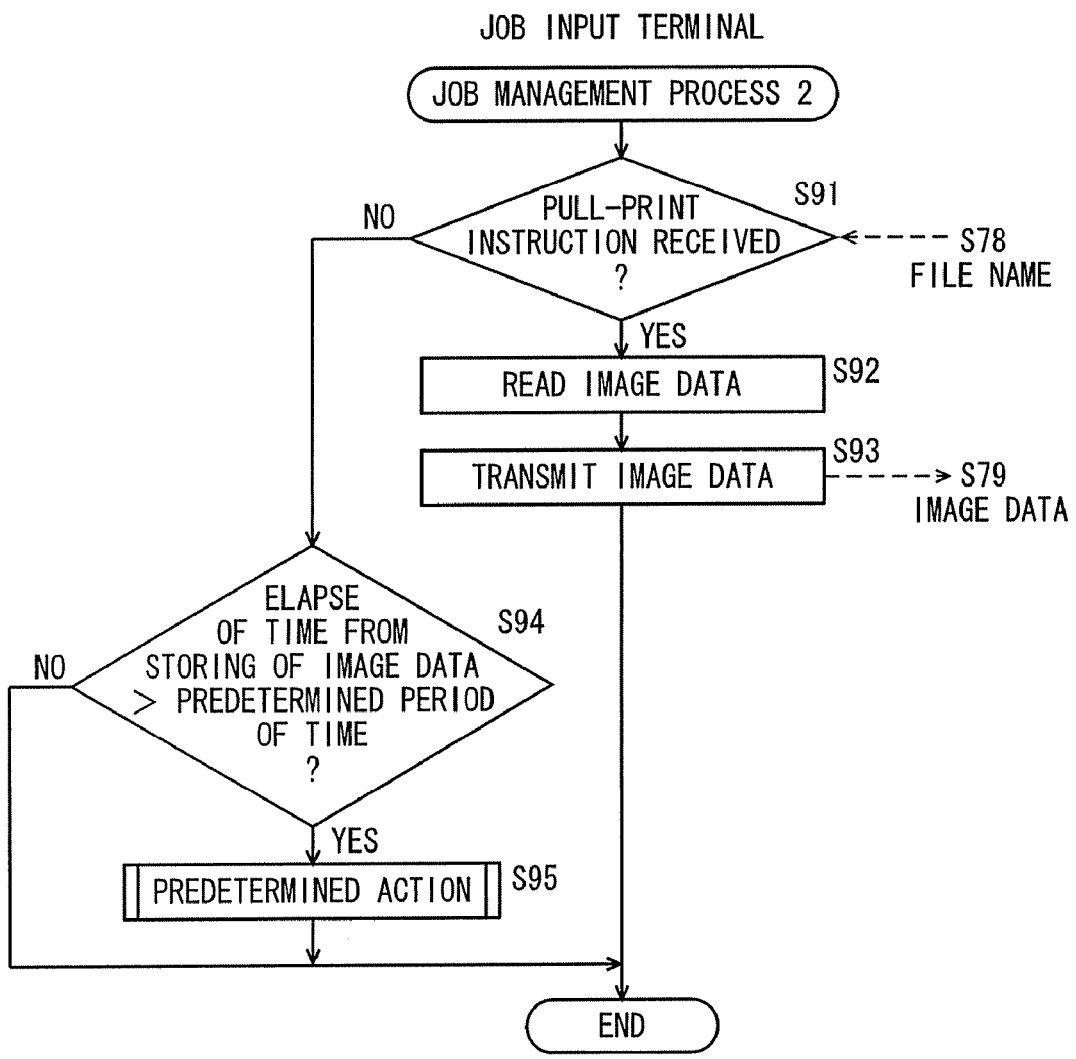
FIG. 11 is a flowchart showing an example of the flow of job management processing executed at the home terminal.

FIG. 11 is a flowchart showing an example of the flow of job management processing executed at the home terminal. The job management processing is implemented when a job management program stored in the flash ROM 108 is loaded into the RAM 105 of the home terminal and executed at the CPU 101. The job management program is a part of the data transmitting/receiving program.

Referring to FIG. 11, in step S91, it is determined whether a pull-print instruction is received or not. If the pull-print instruction is received, the processing proceeds to step S92, and if it is not received, the processing proceeds to step S94. In step S92, the image data specified by the file name included in the pull-print instruction received is read. Then, the read image data is transmitted to the MFP 100B, which is the job output terminal that transmitted the pull-print instruction (step S93), and the processing is ended. When the image data is transmitted, MFP100 deletes the image data from its HDD107. This prevents the image data from being stored in the HDD 107 for a long time.

In step S94, it is determined whether a predetermined period of time has elapsed from storing of the image data. The elapse of time from storing of the image data is computed from the present time and the storing time that is stored in association with the image data when the image data is stored in step S39 shown in FIG. 7. If a predetermined period of time has elapsed from storing of the image data, the processing proceeds to step S95, and if not elapsed, the processing is ended. The image data is transmitted to the job output terminal by the destination user's operation of reading the image data (step S93). The operation of reading the image data includes logging into the job output terminal (step S71) and input of an output instruction (step S77). A predetermined elapse of time from storing of the image data means that the destination user has not carried out the operation of reading the image data in the meantime. In this case, the MFP 100, which is the job input terminal, carries out a predetermined action (step S95).

In the image-processing system 1 according to the first embodiment, image data is stored in the job input terminal MFP 100 or the user's home terminal MFP 100A. Thus, when the job input terminal MFP 100 transmits image data to the home terminal MFP 100A, processing similar to the job management processing shown in FIG. 11 is executed at the home terminal MFP 100A. However, if the home terminal MFP 100A carries out the job management processing shown in FIG. 11, the processing is ended unless a pull-print instruction is received in step S91 without executing step S94 and step S95.

Figure 12:
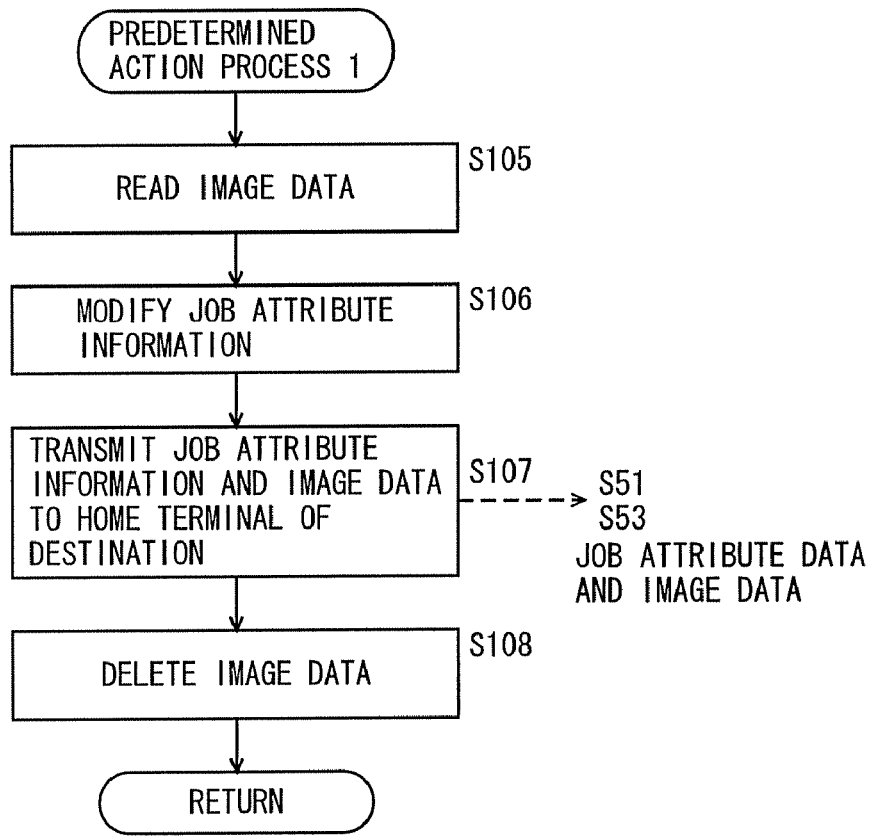
FIG. 12 is a flowchart showing a first example of the flow of processing of a predetermined action.

FIG. 12 is a flowchart showing a first example of the flow of processing of a predetermined action. This processing is executed in step S95 shown in FIG. 11. Referring to FIG. 12, in step S105, the image data whose storing time has elapsed a predetermined period of time is read from the HDD 107. Then, job attribute information corresponding to the image data is modified (step S106). The job attribute information that is the object of the modification is the job attribute information generated in step S40 shown in FIG. 7. It is possible that the job attribute information is stored in a volatile memory such as a RAM or in the HDD 107 in association with the image data. The location information of the image data of the job attribute information includes the apparatus identification information of the job input terminal MFP 100. In step S106, in order to transmit the image data to the MFP 100A, which is the home terminal of the destination user "Julie," the location information of the image data of the job attribute information is modified to a predetermined area of the HDD 107 of the MFP 100A, which is the home terminal of the user "Julie." As a result, the modified job attribute information includes, in the location information of the image data, the apparatus identification information of the MFP 100A, which is the home terminal of the user "Julie." Then, the modified job attribute information and the image data are transmitted to the MFP 100A, which is the home terminal of the user "Julie" (step S107). Then, the image data is deleted from the HDD 107 (step S108). When the job attribute information is stored in association with the image data, the job attribute information is also deleted.

When a predetermined period of time elapses from storing of the image data, the job input terminal MFP 100 transmits the image data to the home terminal of the destination user. This eliminates the possibility of storing the image data in the HDD 107 of the job input terminal MFP 100 for a long time and thus prevents the state of a small storing capacity from being elongated. Thus, the HDD 107 can be used effectively.

Figure 13:
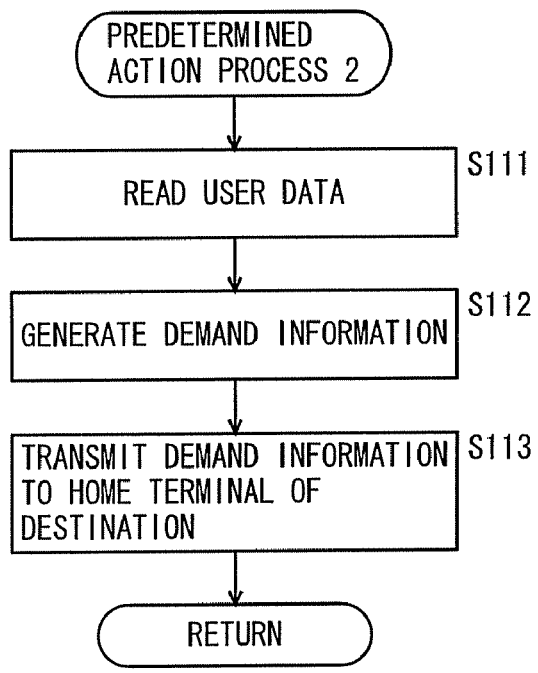
FIG. 13 is a flowchart showing a second example of the flow of processing of a predetermined action.

FIG. 13 is a flowchart showing a second example of the flow of processing of a predetermined action. This processing is executed in step S95 shown in FIG. 11. Referring to FIG. 13, in step S111, the user identification information of the destination user is specified from the job attribute information corresponding to the image data whose storing time has elapsed from a predetermined period of time, and the user data of the destination user including the user identification information is read. The home terminal of the destination user can be specified from the user data. Then, demand information to the destination user is generated (step S112). The demand information is information that demands reading of image data, and includes a message saying, for example, "Image data is received. Read now." Then, the demand information is transmitted to the MFP 100A, which is the home terminal of the destination user "Julie" (step S113). This causes the home terminal MFP 100A to output the demand information to the user "Julie." For example, an electronic mail is transmitted to the user "Julie," a voice message of the demand information is replayed, a message is displayed on the display portion 119B, or the like. It is possible that instead of transmitting the demand information to the MFP 100A, the MFP 100 prepares and transmits an electronic mail including the demand information in the text portion or as an attachment file, with the electronic mail address of the destination user "Julie" being the destination.

When a predetermined period of time elapses from storing of the image data, the job input terminal MFP 100 transmits the demand information to the home terminal of the destination user. This enables the destination user to know that the image data has not been read, and if the user carries out the operation of reading the image data, and image data is transmitted and deleted (step S93). This eliminates the possibility of storing the image data in the HDD 107 of the job input terminal MFP 100 for a long time and thus prevents the state of a small storing capacity from being elongated. Thus, the HDD 107 can be used effectively.

Figure 14:
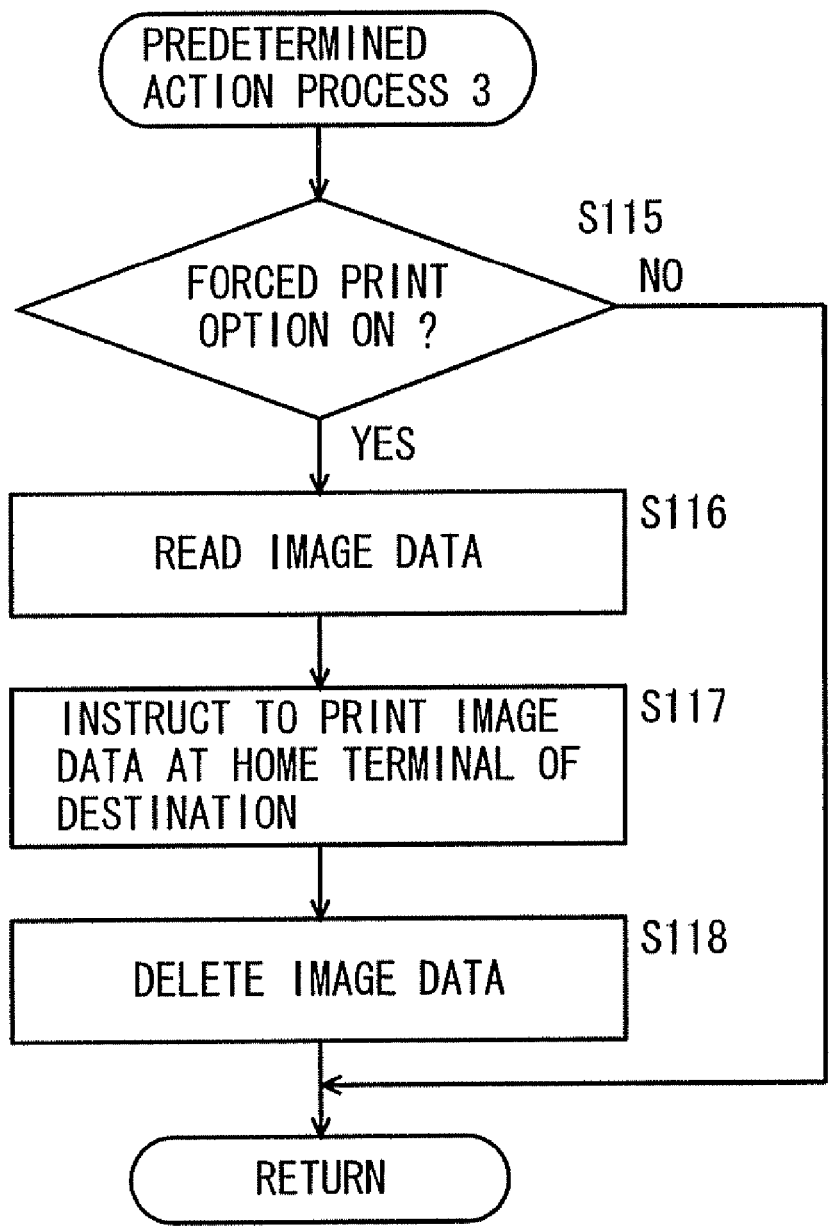
FIG. 14 is a flowchart showing a third example of the flow of processing of a predetermined action.

FIG. 14 is a flowchart showing a third example of the flow of processing of a predetermined action. This processing is executed in step S95 shown in FIG. 11. Referring to FIG. 14, in step S115, it is determined whether a forced print option of the image data stored in the HDD 107 is set at "ON."

Specifically, the determination is made based on whether the forced print option is set by the job setting processing in the image data stored in the HDD 107. If transmission conditions for forced printing are set in the setting area 212 of the sub-window shown in FIG. 6B, the processing proceeds to step S116. If transmission conditions for forced printing are not set, the processing is ended. This is to carry out forced printing of the image data only when the forced print option is set so that the security of the transmitted image data is maintained. It is possible that the job attribute information is adapted to include a flag indicating that transmission conditions for forced printing are set, and that the flag of the job attribute information is set at "ON" upon setting of the transmission conditions for forced printing. This enables determination of whether the forced print option is set by referring to the flag of the job attribute information corresponding to the image data.

In step S116, among image data whose forced options are set at "ON," image data whose storing time has elapsed from a predetermined period of time is read from the HDD 107. Then, an instruction to print the read image data is transmitted to the home terminal of the destination user (step S117). Specifically, the user identification information of the destination user is specified from the job attribute information corresponding to the image data, the user data of the destination user including the user identification information is read, and the home terminal of the destination user is specified. Then, the image data and print instruction are transmitted to the specified home terminal. This causes the home terminal of the user of the destination of the image data, here "Julie," to print the image data. The MFP 100 deletes the image data from its HDD 107.

When a predetermined period of time elapses from storing of the image data, the job input terminal MFP 100 transmits the image data to the home terminal of the destination user and causes the home terminal to print the image data. This eliminates the possibility of storing the image data in the HDD 107 of the job input terminal MFP 100 for a long time and thus prevents the state of a small storing capacity from being elongated. Thus, the HDD 107 can be used effectively.

As described hereinbefore, the image-processing system 1 according to this embodiment is composed of the MFPs 100, 100A, 100B, and 100C each connected to a network. When image data is inputted, the CPU 101 of a job input terminal, e.g., the MFP 100, generates job attribute information that associates user identification information with the location information of the image data on the network, upon input of the image data into the scanner 113, FAX 117, or communication I/F 111. The CPU 101 then switches the MFP 100 into a first mode in which the image data is stored in the HDD 107 of the job input terminal MFP 100 and a second mode in which the image data is transmitted to the MFP 100A, where the destination user "Julie" belongs. In the MFP 100, the forced reception option is set at "OFF" and the forced transmission option is set at "OFF," and the amount of saved data in the HDD 107 is equal to or below a first threshold value. When the size of the image data exceeds a second threshold value, the MFP 100 is switched into the first mode. The MFP 100 is switched into the second mode when the forced reception option is set at "ON," the forced transmission option is set at "ON," the amount of saved data in the HDD 107 is above the first threshold value, or the size of the image data is below the second threshold value.

By transmitting the image data to the home terminal when the forced reception option is set at "ON," the image data can be stored in the MFP 100B, which is determined by the destination user "Julie," who is the receiver of the data. By transmitting the image data to the home terminal when the forced transmission option is set at "ON," the image data can be stored in the MFP 100B, which is determined by the user "David," who is the transmitter of the data. By transmitting the image data to the home terminal when the amount of saved data in the HDD 107 is above the first threshold value, an available area of the HDD 107 can be secured. Further, when the amount of the image data is small, the load of communication on the network 2 is not greatly affected. This enables transmission of the image data to the home terminal so that as much image data as possible can be stored in the home terminal Thus, in the image-processing system 1 according to the first embodiment, since it is determined whether image data is stored in the job input terminal MFP 100 or the home terminal of the destination user under predetermined conditions, image data transmitted or received among the plurality of MFPs 100, 100A, 100B, and 100C, which are connected to the network 2, can be stored effectively.

The case where image data is stored in the HDD 107 of the MFP 100 in the first mode, and the image data is still stored in the HDD 107 after a predetermined elapse of time from the storing time of the image data means the case where an output instruction (step S77) for the image data is not made yet by the destination user. In this case, the job input terminal MFP 100 transmits the image data and modified job attribute information to the MFP 100A, which is the home terminal of the destination user "Julie" (S107). Thus, the image data is no longer stored in the job input terminal MFP 100, which eliminates the possibility of the image data being stored in the HDD 107 of the MFP 100 for a long time and thus prevents the storing area from being wasted.

The job input terminal MFP 100 transmits demand information to demand the destination user to read the image data (S113). When the image data is read by the destination user upon reception of the demand information, the image data is deleted from the HDD 107 of the job input terminal MFP 100, which eliminates the possibility of the image data being stored in the HDD 107 of the MFP 100 for a long time and thus prevents the storing area from being wasted. Further, the job input terminal MFP 100 transmits the image data to the MFP 100A, which is the home terminal of the destination user "Julie," and causes the home terminal to print the image data. Thus, the image data is no longer stored in the job input terminal MFP 100, which eliminates the possibility of the image data being stored in the HDD 107 of the MFP 100 for a long time and thus prevents the storing area from being wasted.

In the image-processing system 1 according to the first embodiment, image data transmitted or received among the plurality of MFPs 100, 100A, 100B, and 100C, which are connected to the network 2, can be stored effectively.

<Second Embodiment>

An overall arrangement of an image-processing system 1 according to a second embodiment is similar to the image-processing system 1 according to the first embodiment shown in FIG. 1. Moreover, the hardware arrangement of the MFPs 100, 100A, 100B, and 100C forming the image-processing system 1 according to the second embodiment is the same as that of the MFP 100 shown in FIG. 2. Thus, the description thereof will not be repeated here. In the image-processing system 1 according to the first embodiment, job attribute information is transmitted to the home terminal of the destination user. In the image-processing system 1 according to the second embodiment, however, image data is transmitted to and stored in a server connected to the network 2. The server is provided with a storing device with a large capacity such as a hard disk drive. To simplify the description, the example where the user "David" transmits from his home terminal MFP 100 image data to the user identification information "Julie" will be described. In this case, the initial input processing is executed at the MFP 100 and the job management processing shown in FIG. 9 is executed at the home terminal of the destination user "Julie." Further, when "Julie," who is assumed to be the destination user here, instructs job output at her home terminal MFP 100A or any of the other MFPs 100, 100B, and 100C (output terminals), the job output processing shown in FIG. 10 is executed at that output terminal.

FIG. 15 is a flowchart showing an example of the flow of the job input processing executed at the job input terminal in the second embodiment. Referring to FIG. 15, the job input processing differs from that shown in FIG. 7 in that steps S36, S38, and S39 are deleted and step S40A is added. Description will be made below of the differences relative to the job input processing shown in FIG. 7.

The processing proceeds to step S40 when the forced reception option is set at "OFF," the forced transmission option is set at "OFF," and the size of the image data is not below the second threshold value. The case where the amount of saved data in the HDD 107 is not above the first threshold value is excluded because the image data is stored in the server. Since the server has a storing device with a large capacity, a sufficient capacity available for storing the image data is secured. When proceeding to step S40, the MFP 100, which is the input terminal in the second embodiment, generates job attribute information without storing the image data in the HDD 107 (step S40), and transmits to the server the job attribute information and the image data (step S40A). Thus, the job attribute information and the image data are stored in the server. Since the image data is transmitted to the server, the job attribute information generated in step S40 has the apparatus identification information of the server set in the location information of the image data.

In the image-processing system 1 according to the second embodiment, since the image data is stored in the server or the home terminal of the destination user, the job management processing shown in FIG. 11 is executed at the server or the home terminal. When, however, the job management processing shown in FIG. 11 is executed at the home terminal, steps S94 and S95 are not executed, and the processing is ended unless a pull-print instruction is received in step S91.

As described hereinbefore, in the image-processing system 1 according to the second embodiment, since image data is stored in a server or the MFP 100B, which is the home terminal of a destination user, the image data is not stored in the HDD 107 of the job input terminal MFP 100. This enables effective use of the storing area of the HDD 107 of the job input terminal MFP 100.

The case where the server stores the image data after a predetermined elapse of time from the storing time of the image data means the case where the destination user has not made an output instruction (step S77) for the image data. In this case, the server transmits, upon reception of the image data and job attribute information transmitted from the job input terminal MFP 100, the image data and modified job attribute information to the MFP 100A, which is the home terminal of the destination user "Julie" (S107). Thus, the image data is stored in the job output terminal, which eliminates the possibility of the image data being stored in the server for a long time and thus prevents the storing area from being wasted. The server transmits, upon reception of the image data transmitted from the job input terminal MFP 100, demand information to demand the destination user to read the image data (S113). When the image data is read by the destination user upon reception of the demand information, the image data is stored in the job output terminal, which eliminates the possibility of the image data being stored in the server for a long time and thus prevents the storing area from being wasted. Further, the server transmits, upon reception of the image data transmitted from the job input terminal MFP 100, the image data to the MFP 100A, which is the home terminal of the destination user "Julie," and causes the home terminal to print the image data. Thus, the image data is no longer stored in the server, which eliminates the possibility of the image data being stored in the server for a long time and thus prevents the storing area from being wasted.

Thus, in the image-processing system 1 according to the second embodiment, image data transmitted or received among the plurality of MFPs 100, 100A, 100B, and 100C, which are connected to the network 2, can be stored effectively.

<Third Embodiment>

Next, an image-processing system 1 according to a third embodiment will be described. An overall arrangement of the image-processing system 1 according to the third embodiment is similar to the image-processing system 1 according to the first embodiment shown in FIG. 1. Moreover, the hardware arrangement of the MFPs 100, 100A, 100B, and 100C forming the image-processing system 1 according to the third embodiment is the same as that of the MFP 100 shown in FIG. 2. Thus, the description thereof will not be repeated here.

In the image-processing system 1 according to the first embodiment, when the MFP 100 is to be connected anew to the network 2 where the MFPs 100A, 100B, and 100C are already connected, the initial setting processing shown in FIG. 3A is executed in the MFP 100, and the connection processing shown in FIG. 3B is executed in the other MFPs 100A, 100B, and 100C. Each processing is executed in the image-processing system 1 according to the third embodiment in a similar manner, and first or second user data is generated in the MFPs 100, 100A, 100B, and 100C. The first or second user data generated in the image-processing system 1 according to the third embodiment, however, does not require apparatus identification information for identifying a home terminal.

Figure 16A:
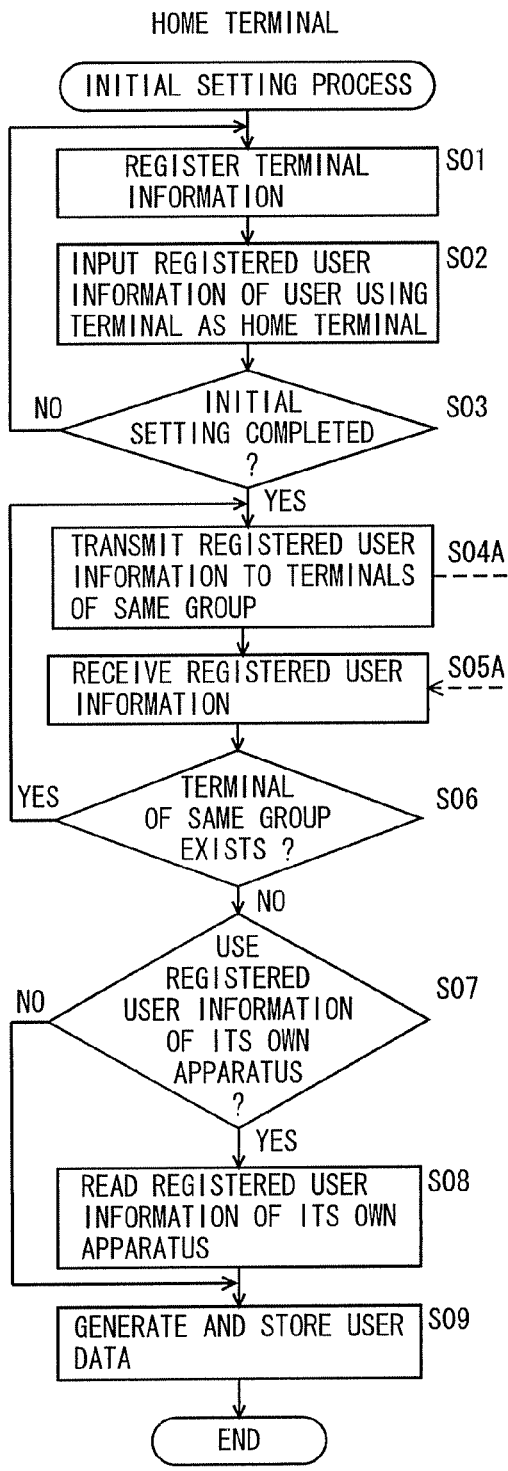
FIG. 16A is a diagram showing another flow of initial setting processing executed at the MFP 100.
Figure 16B:
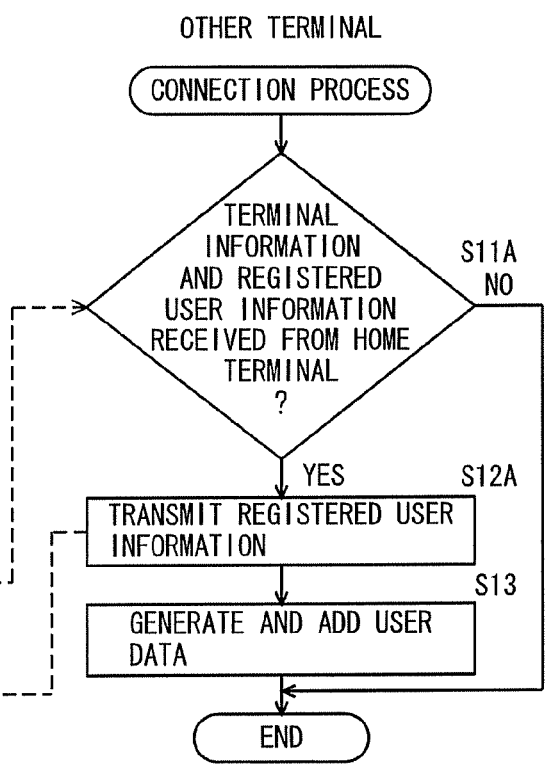
FIG. 16B is a diagram showing an example of another flow of connection processing executed at MFPs 100A, 100B, and 100C when the initial setting processing is executed at the MFP 100.

FIG. 16A is a diagram showing another flow of the initial setting processing executed at the MFP 100. FIG. 16B is a diagram showing an example of another flow of the connection processing executed at the MFPs 100A, 100B, and 100C when the initial setting processing is executed at the MFP 100. The initial setting processing and connection processing are implemented by respectively loading an initial setting program and a connection program stored in the flash ROM 108 into the RAM 105 and executing them by CPU 101. The initial setting program and the connection program are a part of an data transmitting/receiving program.

Referring to FIG. 16A, the initial setting processing here differs from the initial setting processing shown in FIG. 3A in that, while terminal information and registered user information are transmitted in step S04, registered user information is transmitted while the terminal information is not transmitted in step S04A, and in that, while the terminal information and the registered user information are received in step S05, the registered user information is received while the terminal information is not received in step S05A. Moreover, referring to FIG. 16B, the initial setting processing here differs from the initial setting processing shown in FIG. 3B in that, while terminal information and registered user information are received in step S11, the registered user information is received while the terminal information is not received in step S11A, and in that, while terminal information and registered user information are transmitted in step S12, the registered user information is transmitted while the terminal information is not transmitted in step S12A. Thus, in step S09, the MFP 100 generates user data from the registered user information. The user data includes the registered user information.

If it is determined in step S07 that the registered user information of the MFP 100 itself is to be used, all of the registered user information stored in the MFPs 100, 100A, 100B, and 100C put together becomes the user data (first user data), and if it is determined in step S07 that the registered user information of the MFP 100 itself is not to be used, all of the terminal information and registered user information stored in the MFPs 100A, 100B, and 100C but not of the MFP 100 put together becomes the user data (second user data). Then, the generated user data is stored in the HDD 107.

In addition, in each of the MFPs 100A, 100B, and 100C, user data is generated from the registered user information of the MFP 100 received in step S11A, and the generated user data is appended to the user data already stored in the HDD 107 (step S13).

FIG. 17A is a diagram for describing first user data, and FIG. 17B is a diagram for describing second user data. FIGS. 17A and 17B show user data generated in the case where the registered user information shown in FIGS. 4A to 4D are stored in each of the MFPs 100, 100A, 100B, and 100C. Referring to FIGS. 17A and 17B, the first and second user data differ from the first and second user data shown in FIGS. 4E and 4F in that they do not include information related to a home terminal.

[BOX Transmission and Reception]

Here, to simplify the description, the example will be described in which the user of the user identification information "David" inputs at the MFP 100 a job of transmitting image data to the destination of user identification information "Julie." In this case, job input processing is executed at the MFP 100. In the job input processing, user authentication is performed in response to a log-in request by the user "David," and thereafter, job setting processing is executed. Moreover, although the example of executing the job input processing at a home terminal is described here, the job input processing can also be executed at a terminal other than the home terminal.

FIG. 18 is another flowchart showing the flow of the job input processing executed at the job input terminal. Referring to FIG. 18, the job input processing differs from that in the first embodiment shown in FIG. 7 in that step S41 is deleted and step S42A is added between step S42 and S43A. In the image-processing system 1 according to the third embodiment, as shown in FIGS. 17A and 17B, the first and second data do not include information related to a home terminal. Thus, job attribute information generated in step S40 is not transmitted to a home terminal but is stored in the job input terminal MFP 100. In step S42A, in order to transmit job attribute information and image data to a home terminal in step S43, the processing of detecting the home terminal of the destination user "Julie" is executed.

FIG. 19 is a diagram showing an example of the format of the job attribute information according to the third embodiment. Referring to FIG. 19, the job attribute information includes information of transmission origin, destination information, and image data information. The information of transmission origin is user identification information of the user who instructed the execution of the job input processing, who is, here, "David." The destination information includes user identification information of the user of the destination. Here, the user identification information of the destination information is "Julie." The image data information includes apparatus identification information of a terminal in which the image data information is stored and a file name stored in that terminal.

Since the image data is stored in the HDD 107 of the job input terminal MFP 100, the job attribute information generated in step S40 shown in FIG. 18 includes the IP address of the MFP 100 set in the apparatus identification information of the image data information, and in the file name, a direct path is set including information (for instance, a device name or a drive name) which specifies the HDD 107. For the job attribute information generated in step S42 shown in FIG. 18, since the image data is stored in the HDD 107 of the MFP 100A, which is the home terminal of the destination user "Julie," the IP address of the MFP 100A is set in the apparatus identification information of the image data information, and in the file name, a direct path is set including information which specifies the HDD 107. Thus, the image data information is location information on the network 2 where the image data is stored and includes at least the apparatus identification information (the IP address of the apparatus). The image data information can be a URL.

FIG. 20A is a flowchart showing an example of the flow of home-terminal-detection processing. The home-terminal-detection processing is executed in step S42 shown in FIG. 18. FIG. 20B is a flowchart showing an example of the flow of home-terminal-response processing. The home-terminal-response processing is executed in a MFP other than the MFP to execute the home-terminal-detection processing. The home-terminal-detection processing and home-terminal-response processing are implemented when a home-terminal-detection program and a home-terminal-response program stored in the flash ROM 108 are loaded into the RAM 105 and executed at the CPU 101 in each of the MFPs 100, 100A, 100B, and 100C. The home-terminal-detection processing and home-terminal-response processing are a part of a data transmitting/receiving program.

Referring to FIGS. 20A and 20B, in a job input terminal, a detection request for detecting a home terminal is transmitted to the network 2 by broadcast (step S91). The detection request includes user identification information of a user of a destination. In a terminal other than the job input terminal, the processing stands by until the detection request is received ("NO" in step S95), and the processing proceeds to step S96 when the detection request is received. In step S96, it is detected whether registered user information including user identification information included in the detection request received in step S95 is stored in the HDD 107 or not. If such registered user information is stored, the processing proceeds to step S97, and if not, step S97 is skipped and the processing is ended. When the registered user information including the user identification information included in the detection request is stored in HDD 107, the terminal other than the job input terminal is a home terminal of the user of that user identification information. Thus, in step S97, in order to notify the job input terminal that it is itself a home terminal, apparatus identification information for identifying the terminal other than the job input terminal is transmitted to the job input terminal.

In the job input terminal, it is determined whether the apparatus identification information is received according to the transmission of the detection request (step S91) or not (step S92). If it is received, the processing proceeds to step S93, but if it is not received, the processing proceeds to step S94. In step S93, the terminal identified by the received apparatus identification information is set as a home terminal of the user specified by the user identification information. In step S94, it is set as a home terminal of the user specified by the user identification information being nonexistent. In this case, error handling can also be performed.

Moreover, although the detection request is transmitted by broadcast in step S91, the other MFPs 100A, 100B, and 100C connected to the network 2 can be detected and the detection request can be transmitted to the other MFPs 100A, 100B, and 100C one by one. In this case, by ending the processing upon detection of a home terminal, the processing time can be efficiently shortened.

Figure 21:
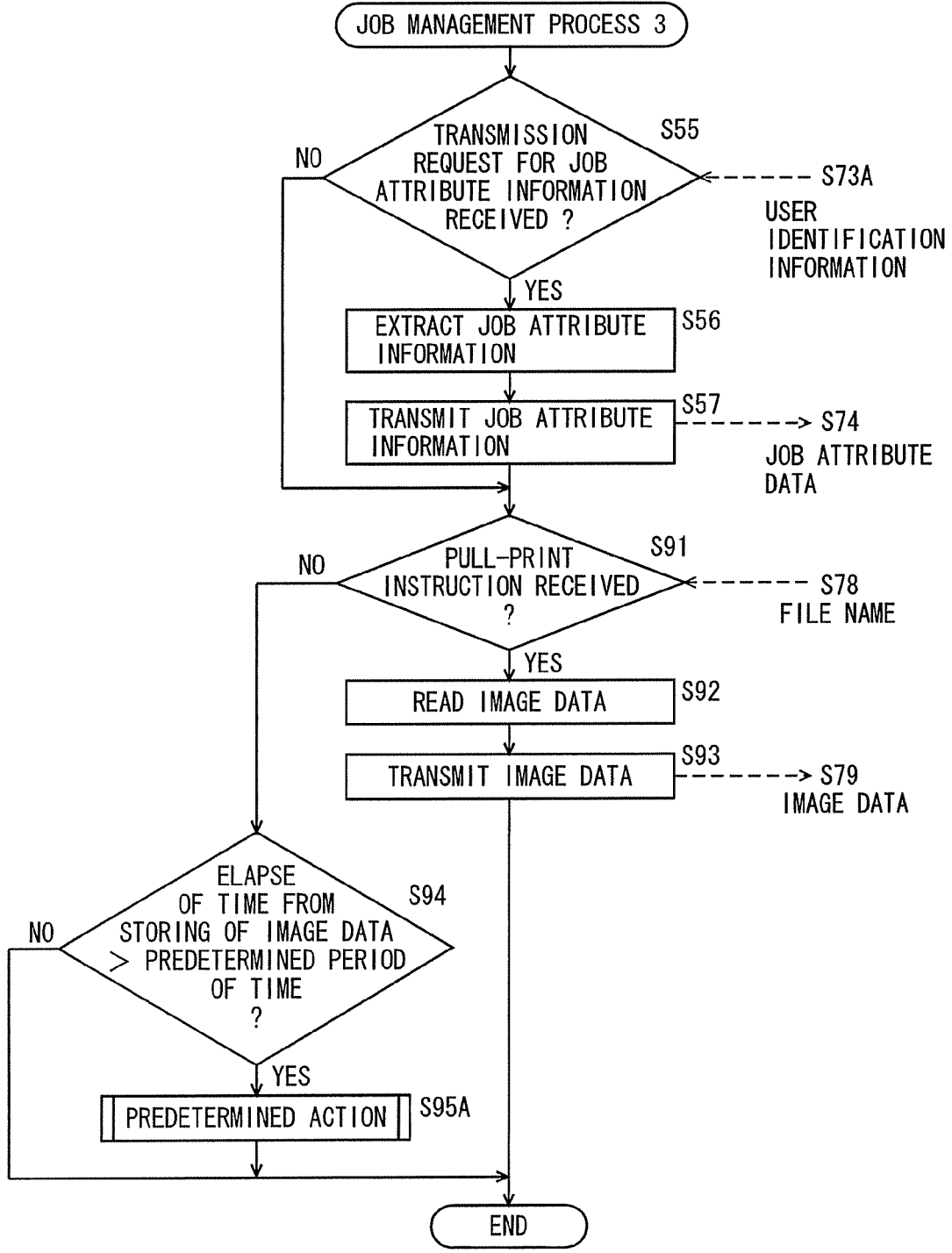
FIG. 21 is another flowchart showing an example of the flow of job management processing executed at a terminal other than the job output terminal.
Figure 22:
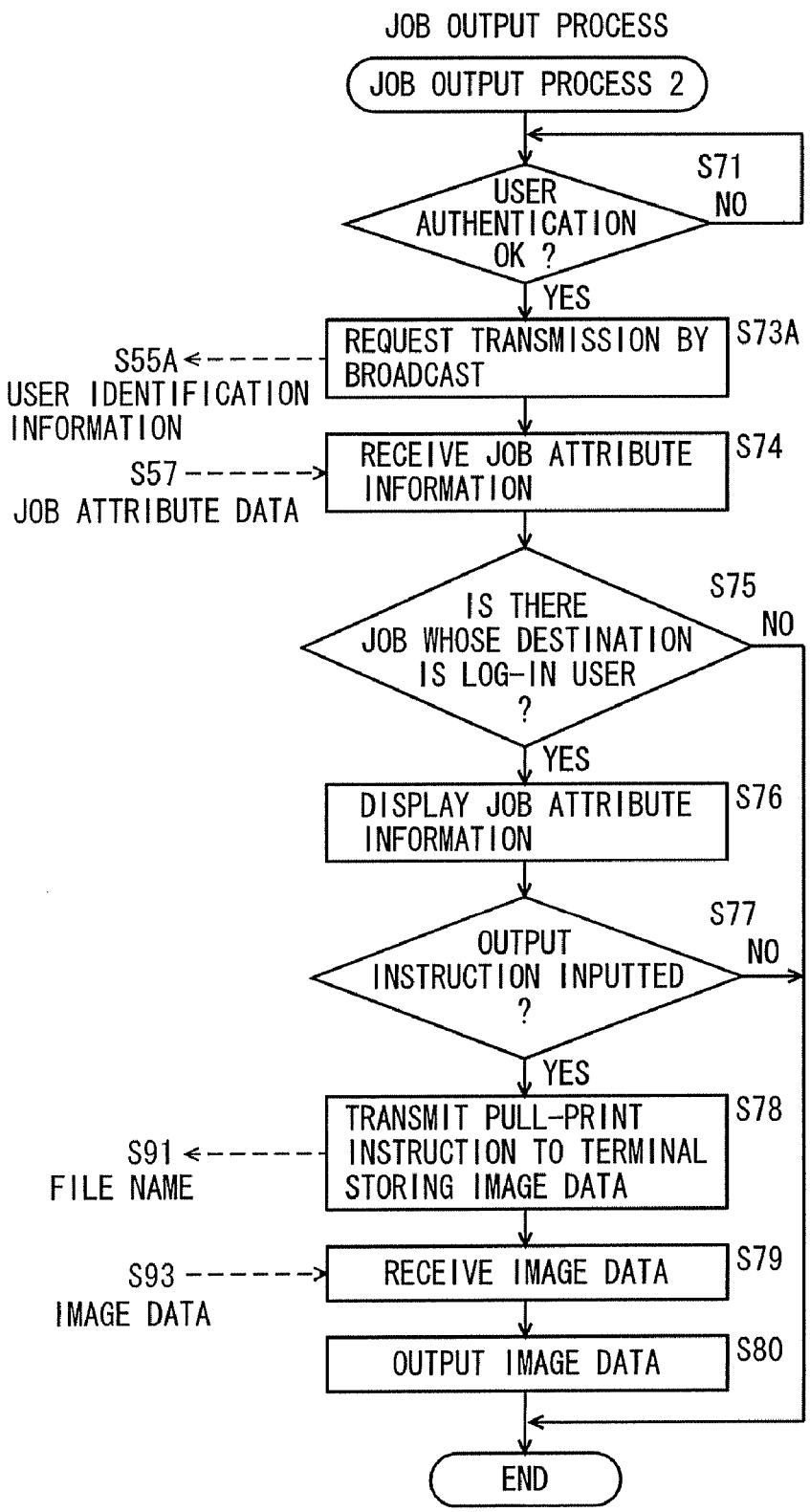
FIG. 22 is another flowchart showing an example of the flow of job output processing executed at a job output terminal.

Next, output of image data will be described. The case where the user of user identification information "Julie" logs into the MFP 100B will be describe as an example. In this case, the MFP 100B correspond to the job output terminal. FIG. 21 is another flowchart showing an example of the flow of job control processing executed at a terminal other than the job output terminal. FIG. 22 is another flowchart showing an example of the flow of job output processing executed at a job input terminal.

Referring to FIG. 22, in the job output terminal MFP 100B, user authentication of the user of the user identification information "Julie" is performed (step S71). As a result of the user authentication, if the user is authenticated, log-in is permitted and the processing proceeds to step S73A, but if not authenticated, log-in is not permitted and the processing stands by. In other words, the job output processing is executed on condition that at least user identification information is inputted at the job output terminal. In step S73A, a signal requesting transmission of job attribute information which includes the user identification information "Julie" is transmitted by broadcast. This signal that requests the transmission of the job attribute information includes the user identification information "Julie."

Referring to FIG. 21, the processing in steps S55 through S57 is the same as the processing in steps S55 through S57 shown in FIG. 9, and the processing in steps S91 through S94 is the same as the processing in steps S91 through S94 shown in FIG. 11. The description thereof therefore will not be repeated. In step S95A, the processing of a predetermined action is executed. There is a case where the home terminal and the job input terminal are also used as terminals other than the job output terminal. The processing in steps S94 and S95A is not executed at the home terminal but only at the job input terminal.

Referring again to FIG. 22, in the job output terminal, job attribute information is received according to the transmission request transmitted in step S73 (step S74). The processing in steps S75 through S80, which is executed at the job output terminal after reception of the job attribute information, is the same as the processing shown in FIG. 10, and therefore description thereof will not be repeated.

Figure 23:
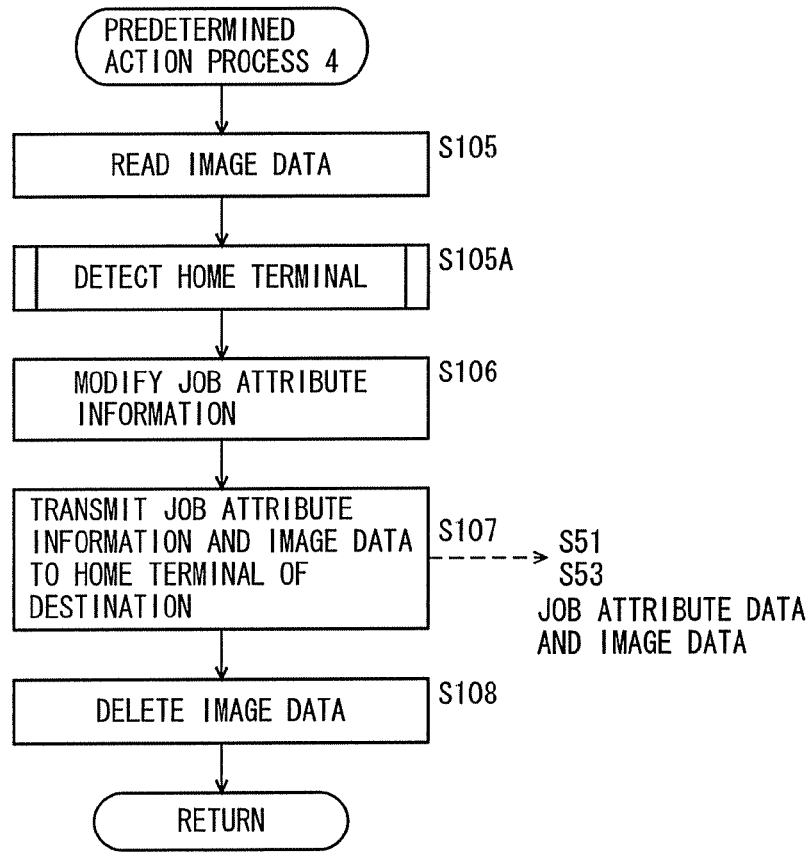
FIG. 23 is a flowchart showing a fourth example of the flow of processing of a predetermined action.

FIG. 23 is a flowchart showing a fourth example of the flow of processing of a predetermined action. This processing is executed in step S95A shown in FIG. 21. Referring to FIG. 23, this processing differs from that shown in FIG. 12 in that step S105A is added between steps S105 and S106. In step S105A, similarly to step S42A shown in FIG. 18, the processing of detecting the home terminal of the destination user "Julie" is executed in order to transmit the job attribute information and image data to the home terminal in step S107.

When a predetermined period of time elapses from storing of the image data, the job input terminal MFP 100 transmits the image data to the home terminal of the destination user. This eliminates the possibility of storing the image data in the HDD 107 of the job input terminal MFP 100 for a long time and thus prevents the state of a small storing capacity from being elongated. Thus, the HDD 107 can be used effectively.

Figure 24:
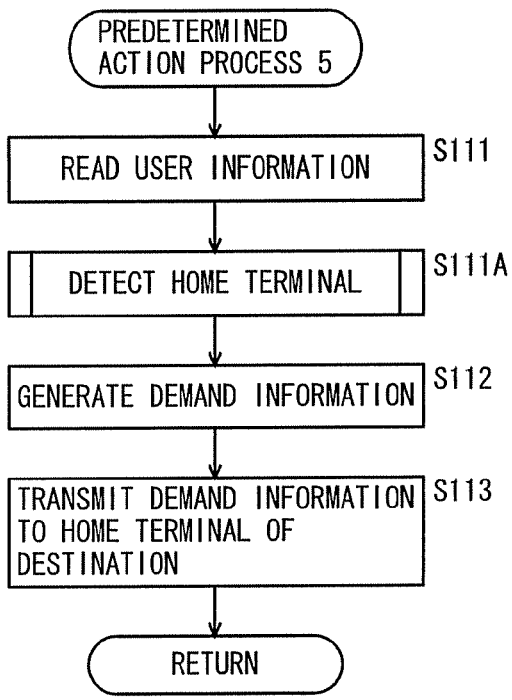
FIG. 24 is a flowchart showing a fifth example of the flow of processing of a predetermined action.

FIG. 24 is a flowchart showing a fifth example of the flow of processing of a predetermined action. This processing is executed in step S95A shown in FIG. 21. Referring to FIG. 24, this processing differs from that shown in FIG. 13 in that step S111A is added between steps S111 and S112. In step S111A, similarly to step S42A shown in FIG. 18, the processing of detecting the home terminal of the destination user "Julie" is executed in order to transmit demand information to the home terminal in step S113. When a predetermined period of time elapses from storing of the image data, the job input terminal MFP 100 transmits the demand information to the home terminal of the destination user. This enables the destination user to know that the image data is received, and the user's operation of reading the image data makes the image data transmitted and erased (step S93). This eliminates the possibility of storing the image data in the HDD 107 of the job input terminal MFP 100 for a long time and thus prevents the state of a small storing capacity from being elongated. Thus, the HDD 107 can be used effectively.

Figure 25:
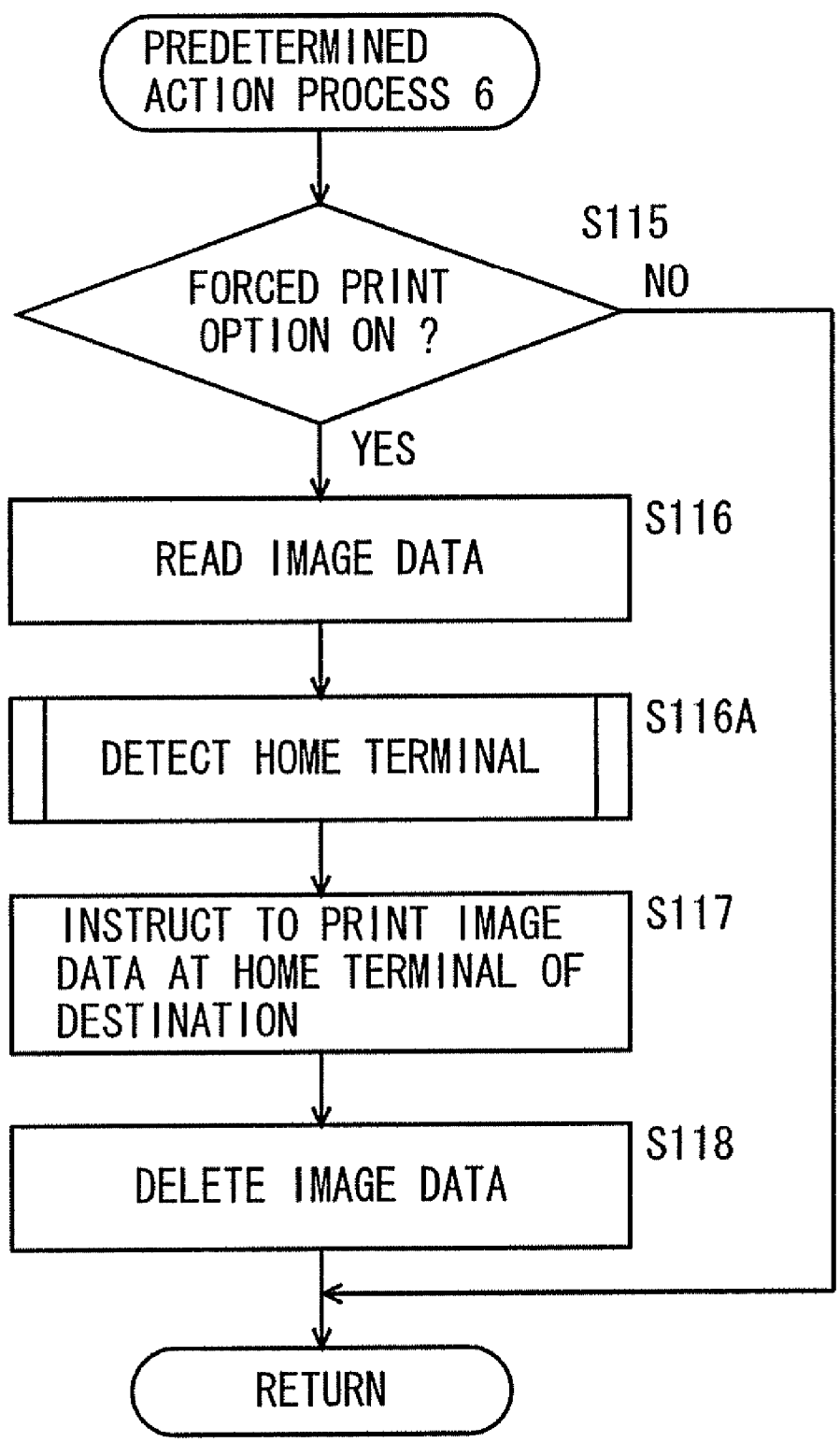
FIG. 25 is a flowchart showing a sixth example of the flow of processing of a predetermined action.

FIG. 25 is a flowchart showing a sixth example of the flow of processing of a predetermined action. This processing is executed in step S95A shown in FIG. 21. Referring to FIG. 25, this processing differs from that shown in FIG. 14 in that step S116A is added between steps S116 and S117. In step S116A, similarly to step S42A shown in FIG. 18, the processing of detecting the home terminal of the destination user "Julie" is executed in order to instruct the home terminal to carry out forced printing of the image data in step S117. When a predetermined period of time elapses from storing of the image data, the job input terminal MFP 100 transmits the image data to the home terminal of the destination user and causes the home terminal to print the image data. This enables the destination user to know that the image data is received, and the user's operation of reading the image data makes the image data transmitted and erased (step S93). This eliminates the possibility of storing the image data in the HDD 107 of the job input terminal MFP 100 for a long time and thus prevents the state of a small storing capacity from being elongated. Thus, the HDD 107 can be used effectively.

In the third embodiment, although the initial setting processing shown in FIG. 16A and the connection processing shown in FIG. 16B are executed at the MFPs 100, 100A, 100B, and 100C, these processings are not necessarily executed. That is, in the image-processing system 1 according to the third embodiment, not all of the MFPs 100, 100A, 100B, and 100C need to store the first and second user data in order to execute the processing shown in FIGS. 18, 21, and 22. In this case, in step S32 shown in FIG. 18, image data to be transmitted is designated and user identification information for identifying the user of the transmission destination is designated. For the user identification information, registered user data may not necessarily be stored in the job input terminal that executes the processing in step S32, e.g., the MFP 100; the registered user data may be stored in any one of the MFPs 100, 100A, 100B, and 100C.

As described hereinbefore, in the image-processing system 1 according to the third embodiment, home-terminal-detection processing is executed to detect the home terminal of the destination user. Thus, the same advantageous effects as those in the first embodiment can be obtained without storing the first user data and the second data in the MFPs 100, 100A, 100B, and 100C.

While in the above embodiments, description has been made of the image-processing system 1, it will be readily appreciated that the present invention can be taken as a data transmitting/receiving method and a data transmitting/receiving program executed at the MFPs 100, 100A, 100B, and 100C included in the image-processing system 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information-processing system including a plurality of image-processing apparatuses each connected to a network, wherein each of said plurality of image-processing apparatuses includes a user data storing unit to store user data associating user identification information for identifying each of a plurality of users with apparatus identification information for identifying at least one of said plurality of image-processing apparatuses comprising:

a transmitting device among said plurality of image-processing apparatuses including a designation unit to designate an arbitrary destination user as a receiver of transmitted data targeted for transmission, a specifying unit to acquire said apparatus identification information associated by said user data with user identification information for said destination user designated by said designation unit, an association data generating unit to generate association data associating location information for said transmitted data on said network with user identification information for said destination user, an association data storing unit, in a case where an image-processing apparatus specified by apparatus identification information associated by said user data with user identification information for said destination user is the transmitting device itself, to store said association data in a storing device of the transmitting device itself, and in a case where an image-processing apparatus specified by apparatus identification information associated by said user data with user identification information for said destination user is not the transmitting device itself, in order to cause a storing device of an image-processing apparatus specified by apparatus identification information associated by said user data with user identification information for said destination user among said plurality of image-processing apparatuses to store said association data, to transmit said association data to said specified image-processing apparatus, a data storing unit to store said transmitted data in a storing device in a case of being switched to a first mode, a data transmitting unit, in a case of being switched to a second mode, in order to cause a storing device of the transmitting device, to transmit said transmitted data to said specified image-processing apparatus, and a control unit to control switching between said first mode and said second mode in accordance with a predetermined condition; and, a receiving device among said plurality of image-processing apparatuses including a user identification information inputting unit to accept input of user identification information, an association data acquiring unit to acquire association data including user identification information accepted by said user identification information inputting unit from an image-processing apparatus specified by apparatus identification information associated by said user data with said accepted user identification information among said plurality of image-processing apparatuses, and a data acquiring unit to acquire said transmitted data from an image-processing apparatus specified by apparatus identification information associated by said user data with said user identification information among said plurality of image-processing apparatuses.

2. The information-processing system according to claim 1, wherein a condition for said control unit to control in said second mode is that a data size of said transmitted data is smaller than a predetermined value.

3. The information-processing system according to claim 1, wherein a condition for said control unit to control in said second mode is that an amount of data already stored in said storing device of the transmitting device itself is larger than a predetermined value.

4. The information-processing system according to claim 1, wherein a condition for said control unit to control in said second mode is that a choice is made by a user who operates said designation unit.

5. The information-processing system according to claim 1, wherein a condition for said control unit to control in said second mode is that a choice is made by a destination user designated by said designation unit.

6. The information-processing system according to claim 1, wherein in said first mode, attribute information is transmitted to said image-processing apparatus to which said destination user specified by said specifying unit is registered.

7. A method for transmitting and receiving data, said method being executed in an information-processing system including a plurality of image-processing apparatuses each connected to a network, wherein each of said plurality of image-processing apparatuses includes a user data storing unit to store user data associating user identification information for identifying each of a plurality of users with apparatus identification information for identifying at least one of said plurality of image-processing apparatuses, said method comprising:

a designating step to designate an arbitrary destination user as a receiver of transmitted data targeted for transmission from a transmitting device among said plurality of image-processing apparatuses;

a specifying step to acquire said apparatus identification information associated by said user data with user identification information for said designated destination user;

generating association data associating location information for said transmitted data on said network with user identification information for said destination user;

in a first mode, storing said association data in a storing device of the transmitting device itself, in a case where an image-processing apparatus specified by said apparatus identification information associated by said user data with user identification information for said destination user is the transmitting device itself;

in a second mode, in order to cause a storing device of an image-processing apparatus specified by apparatus identification information associated by said user data with user identification information for said destination user among said plurality of image-processing apparatuses to store said association data, transmitting said association data to said specified image-processing apparatus, in a case where an image-processing apparatus specified by apparatus identification information associated by said user data with user identification information for said destination user is not the transmitting device itself;

storing said transmitted data in a storing device in a case of being switched to the first mode;

a controlling step to control switching between said first mode and said second mode in accordance with a predetermined condition; and a data transmitting unit, in a case of being switched to the second mode, in order to cause a storing device of the transmitting device, to transmit said transmitted data to said specified image-processing apparatus.

8. The method according to claim 7, wherein said image-processing apparatus is a Multi Function Peripheral including at least a copying function and a printing function, and transmits and receives image data between said plurality of image-processing apparatuses.

9. The method according to claim 8, wherein in addition to image data, attribute information including at least destination user information is transmitted and received between said plurality of image-processing apparatuses.

10. The method according to claim 8, wherein in said first mode, attribute information is transmitted to said image-processing apparatus to which said destination user specified in said specifying step is registered.

11. An image-processing apparatus connected to a plurality of image-processing apparatuses via a network, wherein each of said plurality of image-processing apparatuses includes a user data storing unit to store user data associating user identification information for identifying each of a plurality of users with apparatus identification information for identifying at least one of said plurality of image-processing apparatuses, said image-processing apparatus comprising:
- a designation unit to designate an arbitrary destination user as a receiver of transmitted data targeted for transmission,
- a specifying unit to acquire said apparatus identification information associated by said user data with user identification information for said destination user designated by said designation unit,
- an association data generating unit to generate association data associating location information for said transmitted data on said network with user identification information for said destination user,
- an association data storing unit, in a case where an image-processing apparatus specified by apparatus identification information associated by said user data with user identification information for said destination user is the image-processing apparatus itself, to store said association data in a storing device of the image-processing apparatus itself,
- and in a case where an image-processing apparatus specified by apparatus identification information associated by said user data with user identification information for said destination user is not the image-processing apparatus itself, in order to cause a storing device of an image-processing apparatus specified by apparatus identification information associated by said user data with user identification information for said destination user among said plurality of image-processing apparatuses to store said association data, to transmit said association data to said specified image-processing apparatus,
- a data storing unit to store said transmitted data in a storing device in a case of being switched to a first mode,
- a data transmitting unit, in a case of being switched to a second mode, in order to cause a storing device of the image-processing apparatus, to transmit said transmitted data to said specified image-processing apparatus, and
- a control unit to control switching between the first mode and the second mode in accordance with a predetermined condition.

12. The image-processing apparatus according to claim 11, wherein said image-processing apparatus is a Multi Function Peripheral including at least a copying function and a printing function, and transmits and receives image data between said plurality of image-processing apparatuses.

13. The image-processing apparatus according to claim 12, wherein in addition to image data, attribute information including at least destination user information is transmitted and received between said plurality of image-processing apparatuses.

14. The image-processing apparatus according to claim 13, wherein in said first mode, said attribute information is transmitted to said image-processing apparatus to which said destination user specified by said specifying unit is registered.

15. The image-processing apparatus according to claim 13, wherein in said first mode, the image data and attribute information are stored in a predetermined storing device on said network, and in said second mode, the image data and attribute information are transmitted to said image-processing apparatus to which said destination user specified by said specifying unit is registered.

* * * * *